(12) United States Patent
Shimizu et al.

(10) Patent No.: US 8,116,006 B2
(45) Date of Patent: Feb. 14, 2012

(54) IMAGE DISPLAY APPARATUS AND HEAD MOUNT DISPLAY

(75) Inventors: Yoshie Shimizu, Ibaraki (JP); Yasushi Tanijiri, Osakasayama (JP); Takeshi Endo, Osaka (JP); Tetsuya Noda, Tenri (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1013 days.

(21) Appl. No.: 12/008,480

(22) Filed: Jan. 11, 2008

(65) Prior Publication Data

US 2010/0284070 A1    Nov. 11, 2010

Related U.S. Application Data

(62) Division of application No. 11/440,649, filed on May 25, 2006, now Pat. No. 7,405,881.

(30) Foreign Application Priority Data

May 30, 2005   (JP) ................................. 2005-156906
Aug. 16, 2005  (JP) ................................. 2005-235626
Feb. 15, 2006  (JP) ................................. 2006-37932

(51) Int. Cl.
   *G02B 27/14*   (2006.01)
   *G09G 5/00*    (2006.01)

(52) U.S. Cl. .......................................... 359/630; 345/7

(58) Field of Classification Search .......... 359/409–410, 359/462, 466, 638–639, 13–14, 603–636, 359/404, 407; 345/7, 9; 348/115; 353/11–12, 353/28, 119; 349/11; 340/438, 980, 995.1, 340/815.47, 815.74
See application file for complete search history.

(56) References Cited

U.S. PATENT DOCUMENTS 5,748,377 A * 5/1998 Matsumoto et al. .......... 359/633

6,292,305 B1 * 9/2001 Sakuma et al. ............... 359/649
(Continued)

FOREIGN PATENT DOCUMENTS

JP      2000-249968 A      9/2000
(Continued)

OTHER PUBLICATIONS

H. Mukawa et al, "Novel Virtual Image Optics or Reflective Microdisplays" by SID Conference Record of the International Display Research Conference, ISSN1083-1312/00/2001-0096—$1.00+.00, 2000 SID (a preparatory proceeding at the Conference from Sep. 25 to 28 in 2000), pp. 96-99.

(Continued)

*Primary Examiner* — Dawayne Pinkney
(74) *Attorney, Agent, or Firm* — Cozen O'Connor

(57) ABSTRACT

The light directed from a light source to a concave mirror and the light directed from a display device to an eyepiece optical system are intersected by each other in a layout. This allows the light source, the concave mirror, and the display device to be arranged in compactness adjacent to the eyepiece optical system without increasing the optical power of an illumination optical system. As the result, the apparatus can easily be minimized in the thickness or the overall size. A hologram optical element is provided where the relationship between the wavelength range $\Delta\lambda 1$ at half of the diffraction efficiency of each of the three primary colors of the light in the hologram optical element and the wavelength range $\Delta\lambda 2$ at half of the intensity of each of the three primary colors of the light emitted from the light source is defined by $\Delta\lambda 1 < \Delta\lambda 2$. Accordingly, a component at desired wavelengths of each of the R, G, and B colors of the light emitted from the light source can be diffracted by the action of the hologram optical element and then directed to the pupil of the viewer. This allows the image to be increased in the color reproduction area and improved in the quality regardless of the display device actuated in a time-division mode.

33 Claims, 23 Drawing Sheets

U.S. PATENT DOCUMENTS

| | | |
|---|---|---|
| 6,352,346 B1 | 3/2002 | Kasai ............................ 353/98 |
| 6,655,820 B2 * | 12/2003 | Jung et al. .................... 362/318 |
| 6,814,442 B2 * | 11/2004 | Okuyama et al. ............. 353/20 |
| 6,952,312 B2 | 10/2005 | Weber et al. .................. 359/630 |
| 2002/0021498 A1 | 2/2002 | Ohtaka et al. ................. 359/629 |
| 2002/0034016 A1 | 3/2002 | Inoguchi et al. .............. 359/15 |
| 2002/0060851 A1 * | 5/2002 | Yamazaki ...................... 359/630 |
| 2002/0167733 A1 * | 11/2002 | Roest ............................. 359/625 |
| 2005/0141066 A1 | 6/2005 | Ouchi ............................ 359/15 |

FOREIGN PATENT DOCUMENTS

| | | |
|---|---|---|
| JP | 2000-249969 A | 9/2000 |
| JP | 2000-249976 A | 9/2000 |
| JP | 2000-275571 A | 10/2000 |
| JP | 2002-107657 A | 4/2002 |
| JP | 2002-244076 A | 8/2002 |
| JP | 2004-12703 A | 1/2004 |
| JP | 2004-61731 A | 2/2004 |
| JP | 2004-271651 A | 9/2004 |
| JP | 2004-333714 A | 11/2004 |

OTHER PUBLICATIONS

Japanese "Decision of Rejection" dated Jan. 12, 2010 for counterpart Japanese Application No. 2005-235626; together with an English-language translation thereof.

Japanese "Notification of Reasons for Refusal" dated Oct. 20, 2009 for counterpart Japanese Application No. 2005-235626; together with an English-language translation thereof.

Japanese Notification of Reasons for Refusal dated Jun. 6, 2011, for counterpart Japanese Application No. 2006-037932, together with an English translation thereof.

* cited by examiner

IMAGE DISPLAY APPARATUS AND HEAD MOUNT DISPLAY

This application is a divisional application of Application Ser. No. 11/440,649, filed May 25, 2006, now U.S. Pat. No. 7,405,881 which is based on the Japanese Unexamined Applications No. 2005-156906 filed on May 30, 2005, No. 2005-235626 filed on Aug. 16, 2005, and No. 2006-037932 filed on Feb. 15, 2006, of which the disclosures are hereby incorporated by reference.

BACKGROUND OF THE INVENTION

1. Field of the Invention

The present invention relates to an image display apparatus for projecting an image displayed on a display device (for example, a reflective display device) onto the eyes of a viewer as a virtual image, and to a head mounted display (hereinafter referred to as an HMD) equipped with the image display apparatus.

2. Description of the Prior Art

An apparatus is known as a so-called HMD which is mounted on the head of a viewer for projecting the image, which has been produced by a display device, as a virtual image onto the pupil of the viewer across an eyepiece optical system. The display device employed in the HMD is classified into a transmissive type illuminated from the back of its screen and a reflective type illuminated from the front side or the viewer side.

The transmissive type of the display device may be implemented by a transmissive type liquid crystal display (LCD) device which is commonly used in the HMD. As the transmissive type LCD device includes a liquid crystal panel sandwiched by a pair of substrates illuminated from the back by light of illumination, its substrate has to be high in the transmissivity of light such as a glass material. This limits the semiconductor process in the production thus making the integration of pixels at higher density difficult. Also, the transmissive type of the display device is essentially equipped with periphery circuits which includes switching elements (for example, TFT switches) for turning the transmission of light on and off at each pixel, and patterns of wiring. In addition, these periphery circuits are required to be disposed on the same display panel. When the integration of pixels is increased, the proportion of the pixel area to the screen of the display panel (so called the aperture) becomes smaller thus declining both the illumination efficiency and the quality of the image.

On the other hand, the reflective type of the display device has a substrate made of a semiconductor material such as silicon and can thus be increased in the integration of pixels while decreased in the dimensions. Moreover, this allows a periphery circuit to be mounted on the other side of the substrate opposite to the display side, thus ensuring the aperture not declined when the integration of pixels is increased. As the result, the reflection efficiency will significantly be high thus producing a brighter image. This advantage becomes emphasized as the size of pixels is reduced. While the number of pixels remains unchanged, the display panel can be scaled down without sacrificing the brightness. Alternatively, while the size of the display panel remains unchanged, the number of pixels can favorably be increased thus contributing to the higher definition of the image.

Using such a reflective type display device having a variety of merits, the HMD can be advantageous for displaying the image at higher brightness and definition.

FIG. 23 is a cross sectional view schematically showing an arrangement of a conventional image display device of which the display device is of a reflective type. In the arrangement, a PBS (polarized beam splitter) 103 is provided across the optical path between a light source 101 and a reflective display device 102 for separating between an optical path of illumination light emitted from the light source 101 and an optical path of view light released from the reflective display device 102. More specifically, the illumination light emitted from the light source 101 passes through the PBS 103 and is directed toward the reflective display device 102. A reflection (view light) of the illumination light reflected on the reflective display device 102 is reflected by the action of the PBS 103, passes through an eyepiece lens 104, and is directed toward the pupil EP of a viewer. This allows the viewer to view an enlarged image of the image displayed on the reflective display device 102.

The HMD using the conventional image display apparatus is used for a considerable length of time when has been mounted to the head of the viewer and its image display apparatus will hence be as small in the size and light in the weight as possible. However, the conventional image display apparatus includes the PBS 103 which is considerably heavy and will thus remain not lightened.

For compensation, an image display apparatus is disclosed in Patent Document 1, listed below, where the optical path in an illumination optical system are separated from the optical path in a view (eyepiece) optical system with no use of a PBS disposed at the intersection of the two optical paths. This will be explained below in more detail.

FIG. 24 is a cross sectional view schematically showing an arrangement of the image display apparatus of Patent Document 1 for use in an HMD. In the image display apparatus, the light emitted from a light source 201 is converged by a collector lens 202 and directed across a polarizer 203 to a display device 204. An image light from the display device 204 is directed toward the pupil EP of a viewer through another polarizer 205 and an optical element (prism) 206. In particular, those optical elements are arranged so that the reference axis L0 extending from the light source 201 to the display device 204 and the reference axis L0 extending from the display device 204 to the optical element 206 are intersected by each other at the location of the display device 204. This arrangement is intended to reduce the overall dimensions of the image display apparatus.

FIG. 25 is a cross sectional view schematically showing an arrangement of an image monitor apparatus disclosed in Patent Document 2, listed below. In this apparatus, the light emitted from a light source 301 is reflected by the reflective/transmissive surface 302a of a prism 302 and received by a displaying means 303. A reflection of the light from the displaying means 303 is received again by the prism 302 where it is passed through the reflective/transmissive surface 302a this time and then passed across a polarizer 304 and another prism 305 before directed to the monitoring point of a viewer. Since the prism 302 is shared between an illumination optical system for illuminating the displaying means 303 and a monitor optical system for directing the light from the displaying means 303 to the monitor position of the viewer, the apparatus can be decreased in the overall size and widened in the angle of view.

The HMD disclosed in Patent Document 1 is such that the display device 204 is of a ferroelectric LCD type having a wider angle of view, and the image light from this display device is directed toward the pupil of the viewer via an enlargement optical system (a prism 206). Another prism is bonded to the enlargement optical system and its bonding interface is arranged of a half mirror surface. Accordingly, the viewer can view the image received through the half mirror surface from the display device and simultaneously an external scene projected across the prisms.

In addition, the HMD in which the reflective LCD device is actuated in a field sequential mode (time-division mode) and the image light in the R, G, and B colors is directed via the hologram optical system toward the pupil of the viewer, thereby providing the viewer with the image in colors (virtual image) is disclosed, for example, Non-Patent Document 1, listed below.

The patent and non-patent documents mentioned above are as follows:
Patent Document 1: JP-A-2000-249969
Patent Document 2: JP-B-3461297
Non-Patent Document 1: "Novel Virtual Image Optics or Reflective Micro-displays" by H. Mukawa et al., SID Conference Record of the International Display Research Conference, ISSN1083-1312/00/2001-0096-$1.00+0.00, 2000 SID (a preparatory proceeding at the Conference from Sep. 25 to 28 in 2000)

However, as disclosed in Patent Document 1, when the reference axis L0 which extends from the light source 201 to the display device 204 remains not bent but held straight, the optical path has to be lengthened for permitting the collector lens 202 to converge the illumination light emitted from the light source 201 on the screen of the display device 204. Accordingly, the apparatus will be limited in the downsizing and configured in an unfavorable layout possibly with its light source 201 projecting towards the viewer. Alternatively, when the collector lens 202 is increased in the optical power for converging the illumination light emitted from the light source 201 on the screen of the display device 204, its dimensions will increase and then prevent the apparatus from being decreased in the overall size.

Also depicted in Patent Document 1 is the optical path which extends from the light source 201 to the display device 204 is bent by the action of a mirror. The mirror is however located at the light source 201 side about the optical path which extends from the display device 204 to the optical element 206. This causes the light source 201 to be positioned far from the optical element 206 for projecting the light onto the mirror. As the result, the apparatus will be increased in the height thus interrupting the downsizing.

Patent Document 2 has similar drawbacks. Assuming that the light of illumination is directed from the light source 301 to the displaying mean 303 and the light of view travels along the optical path of the light of illumination and is directed from the displaying means 303 to the prism 305 in the view optical system, the optical path of the light of illumination is bent by the prism 302 at the light source 301 side about the optical path of the light of view. Accordingly, the optical path in the illumination optical system has to be lengthened between the light source 301 and the prism 302 to converge the illumination light on the displaying means 303. As the result, the downsizing of the apparatus will be interrupted.

It is also essential for increasing the quality of a color image (to be displayed on a display device and viewed by a viewer) to widen the color reproduction area in the image. For example, when the half mirror but not a hologram optical element is used as a combiner for the image light and the ambient light as disclosed in Patent Document 1, the color reproduction area produced on the ferroelectric LCD device being actuated in a time-division mode (with no use of color filters) may be determined by the wavelength range of the R, G, and B colors of the light emitted from the light source. On the other hand, when a hologram optical element is used as the combiner for the image light and the ambient light as disclosed in Non-Patent Document 1, the color reproduction area produced on the display device being actuated in a time-division mode is determined by a combination of the wavelength range of the R, G, and B colors of the light emitted from the light source and the diffraction wavelength range of the R, G, and B colors of the light in the hologram optical element.

However, Non-Patent Document 1 does not refer to the action of widening the color reproduction area in an image to be viewed, still less the diffraction wavelength range of the R, G, and B colors of the light in the hologram optical element in combination with the wavelength range of the R, G, and B colors of the light emitted from the light source for widening the color reproduction area.

SUMMARY OF THE INVENTION

The prevent invention has been developed in order to solve the foregoing problems, and an object thereof is to provide an image display apparatus arranged in which an optical path extending from a light source to a reflective type display device is bent at an appropriate position thus to decrease the thickness or overall size of the apparatus and a head-mount display equipped with the image display apparatus.

It is another object of the present invention to provide an image display apparatus arranged in which the diffraction wavelength range of the R, G, and B colors of light in a hologram optical element is properly determined in combination with the wavelength range of the R, G, and B colors of the light emitted from a light source thus to widen the color reproduction area and thus improve the quality of an image developed on a display device which is driven in a time-division mode and a head-mount display equipped with the image display apparatus.

For achievement of the object of the present invention, an image display apparatus is provided with: an illumination optical system; a reflective type display device for displaying an image by modulating illumination light from the illumination optical system; and an eyepiece optical system for directing image light from the reflective type display device to the pupil of a viewer. The illumination optical system is provided with: a light source for emitting light; and an optical-path bending member for bending the optical path leading from the light source to the reflective type display device. Here, the optical-path bending member is so arranged that a ray of light traveling from the light source to the optical-path bending member and a ray of light traveling further on the same optical path as the just-mentioned ray of light from the reflective type display device to the eyepiece optical system cross each other in a medium located outside the eyepiece optical system and having a substantially uniform index of refraction.

According to the above apparatus, the light (of illumination) emitted from the light source in the illumination optical system is turned at its optical path by the action of the optical-path bending member and received by the reflective type display device where it is modulated to the image light which is in turn directed across the eyepiece optical system to the pupil of the viewer. The optical-path bending member may be implemented by, e.g., a reflective mirror or a prism.

Also, the optical-path bending member is so arranged that a ray of light traveling from the light source to the optical-path bending member and a ray of light traveling further on the same optical path as the just-mentioned ray of light from the reflective type display device to the eyepiece optical system cross each other in a medium located outside the eyepiece optical system and having a substantially uniform index of refraction. For example, the two rays of light cross each other in the medium (for example, air) outwardly of the eyepiece optical system when the optical-path bending member is located at the side opposite to the light source about the optical path which extends from the reflective type display device to the eyepiece optical system.

According to the above arrangement, the light source can be located adjacent to the optical path which extends from the reflective type display device to the eyepiece optical system with no need of increasing the optical power of the illumination optical system while its optical path remains at a distance required for illuminating the reflective type display device. In addition, since the light source and the optical-path bending member are located opposite to each other about the optical path which extends from the reflective type display device to the eyepiece optical system, a three-piece group of the light source, the optical-path bending member, and the reflective type display device are allocated adjacent to the eyepiece optical system in compactness. As the result, the apparatus can easily be minimized in the thickness or overall size.

Another image display apparatus according to the present invention is provided including: a light source for emitting a light at different wavelengths corresponding to the three primary colors; a display device for displaying an image through modulating the light emitted from the light source at each pixel; and an eyepiece optical system for directing the image received from the display device to the pupil of a viewer. While each pixel in the display device is driven in a time-division mode in response to each of the three primary colors of the light emitted in a time-division sequence from the light source, the eyepiece optical system includes a hologram optical element for diffracting the light at difference wavelengths corresponding to the three primary colors emitted from the light source. In particular, when the wavelength range at half of the diffraction efficiency of each of the three primary colors of the light in the hologram optical element and the wavelength range at half of the intensity of each of the three primary colors of the light emitted from the light source are $\Delta\lambda 1$ and $\Delta\lambda 2$ respectively, they are defined by $\Delta\lambda 1 < \Delta\lambda 2$.

According to the above arrangement, each of the pixels in the display device can be driven in a time-division mode in response to each of the three primary (R, G, and B) colors of the light emitted in a time-division sequence from the light source. The image light in RGB is released in a sequence from the display device, diffracted by the hologram optical element in the eyepiece optical system, and directed to the pupil of the viewer. This allows the viewer to view the color image.

Since the relationship between the wavelength range $\Delta\lambda 1$ at half of the diffraction efficiency of the light in the hologram optical element and the wavelength range $\Delta\lambda 2$ at half of the intensity of the light emitted from the light source is expressed by $\Delta\lambda 1 < \Delta\lambda 2$ at each of the three primary colors of the light, a desired component at the wavelengths of the R, G, and B colors of the light emitted from the light source can favorably be diffracted in the hologram optical element before received by the pupil of the viewer. Accordingly, the image to be viewed, which has been produced by the display device actuated in a time-division mode, can be improved in the purity of each of the R, G, and B colors and its color reproduction area can be widen more than the color reproduction area determined directly from the light emitted from the light source.

A head-mount display according to the present invention is characterized by a combination of the image display apparatus of the present invention and a supporting member for supporting the image display apparatus at the front of a viewer. Accordingly, since the image display device remains supported by the supporting member, its producing image can be viewed at a hand-free manner by the viewer.

DESCRIPTION OF THE DRAWINGS

Other objects and features of the present invention will be more apparent from the following description of preferred embodiments in conjunction with the accompanying drawings, in which.

DESCRIPTION OF THE PREFERRED EMBODIMENTS

Embodiment 1

Embodiment 1 of the present invention will be described referring to the relevant drawings.

1. Arrangement of HMD

Figure 2:
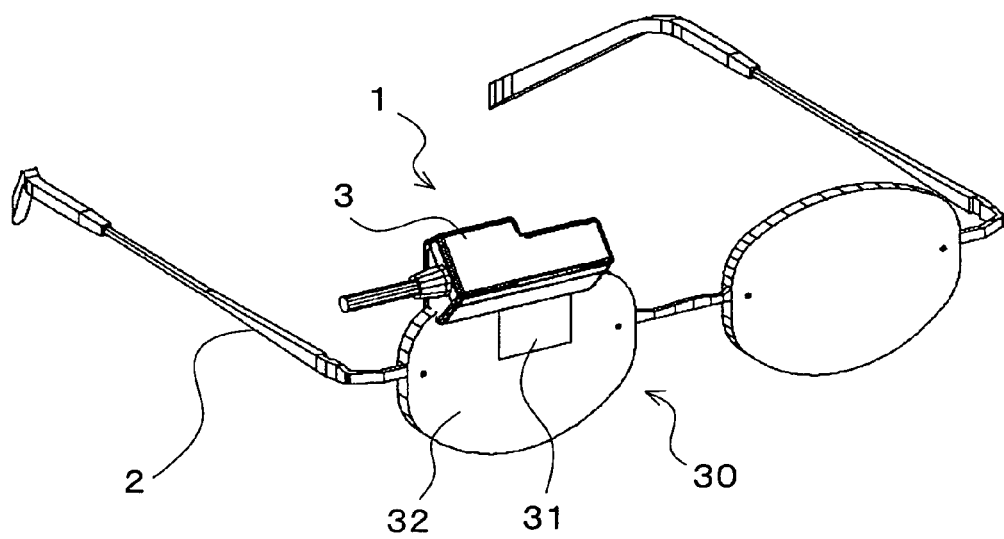
FIG. 2 is a perspective view schematically showing an arrangement of the head-mount display.

FIG. 2 is a perspective view schematically showing an arrangement of a head mount display (hereinafter referred to as an HMD) according to the present invention. The HMD includes an image display apparatus 1 and a supporting member 2 (supporting means) for supporting the image display apparatus 1 in front of eyes of a viewer.

The image display apparatus 1 is arranged for allowing the viewer to view background or external scene in a see-through manner, and at the same time providing an image of interest to be viewed as a virtual image by the viewer. The image display apparatus 1 includes an illumination optical system 10 (See FIG. 1) and a display device 20 (see FIG. 1) both installed in a housing 3 and an eyepiece optical system 30 assembled together with the housing 3. The eyepiece optical system 30 is arranged of substantially one of spectacles (the right eye lens in FIG. 2). The image display apparatus 1 will now be explained in more detail.

2. Arrangement of Image Display Apparatus

Figure 1:
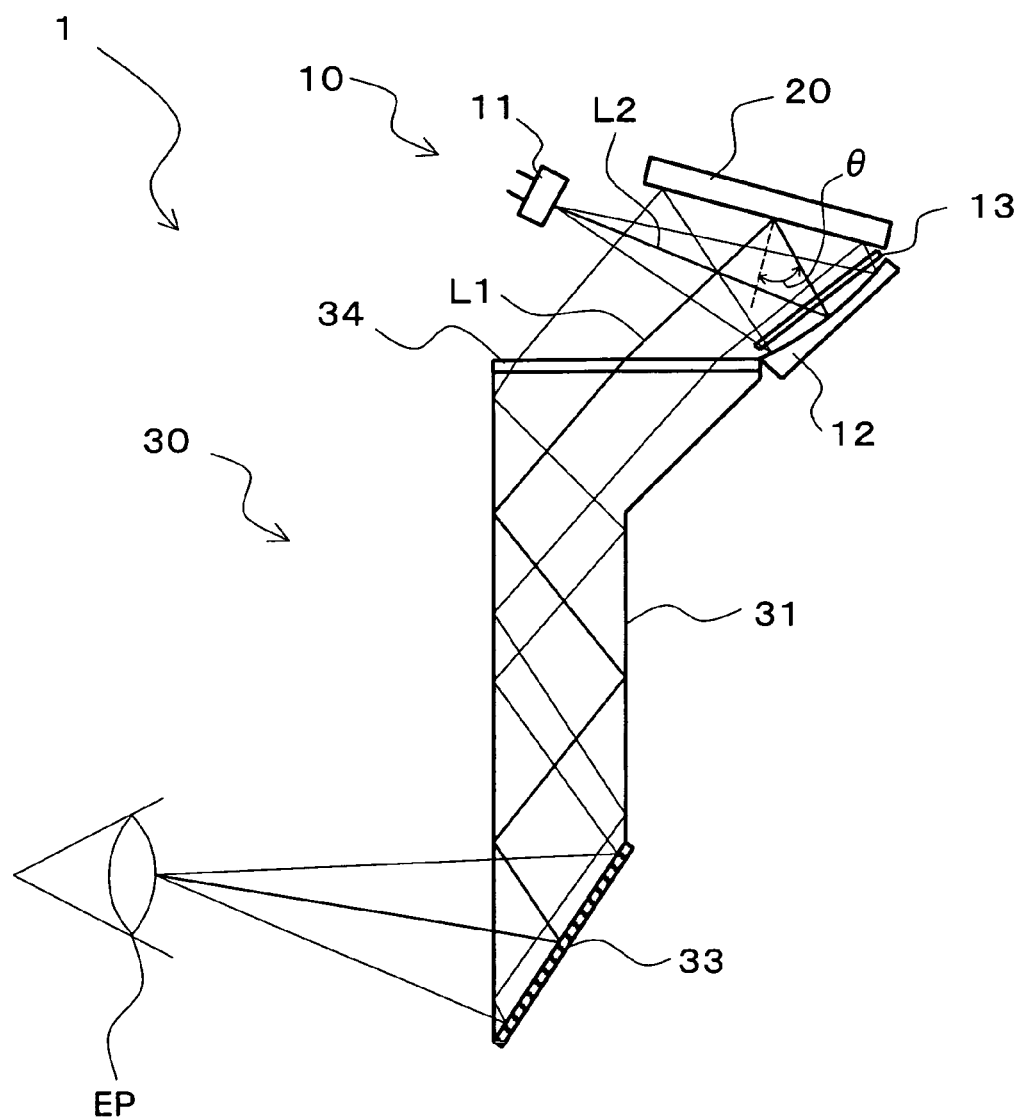
FIG. 1 is a cross sectional view schematically showing an arrangement of an image display apparatus for use in a head-mount display according to one embodiment of the present invention.

FIG. 1 is a cross sectional view schematically showing the image display apparatus 1. The image display apparatus 1 includes the illumination optical system 10, the display device 20, and the eyepiece optical system 30. It is assumed that when the HMD is used by the viewer, its left-to-right direction (along the alignment between the left eye lens and the right eye lens in FIG. 2) extends in a long side direction (vertical to the sheet plane of FIG. 1) of the display device 20, as shown in FIG. 1, and along the direction perpendicular to the incident plane of the optical axis to a hologram optical element 33 which will be described later.

The optical axis extends between the center of the display screen of the display device 20 and the center of the optical pupil in the eyepiece optical system 30. The incident plane is a plane that includes both the optical axis of the light incident on the hologram optical element 33 and the optical axis of the light exiting from the hologram optical element 33.

2-1. Illumination Optical System

The illumination optical system 10 is provided for illuminating the display device 20 and includes a light source 11, a concave mirror 12, and a first polarizer 13. Since the display device 20 in this embodiment is of a reflective type which will be explained later in more detail, the illumination optical system 10 is arranged to illuminate the display device 20 from the front side where the eyepiece optical system 30 is located.

The light source 11 is arranged to emit light towards the display device 20. More specifically, the light source 11 is configured from an integrated RGB color LED unit for emitting lights of the three primary colors, R (red), G (green), and B (blue). Its RGB emitters are aligned in substantially a straight line as in parallel with the long side of the display screen of the display device 20. The light emitted from the light source 11 has a wavelength which is substantially equal to that of the light of diffraction in the hologram optical element 33. The light source 11 and the pupil of the viewer (optical pupil or exit pupil, EP) are located in a conjugate relationship.

Because the display device 20 in this embodiment is a ferroelectric LCD display arranged for time-division operation which will be explained later, the light source 11 emits the three primary colors of light in a time-division sequence. The spectral intensity characteristic of the light source 11 will also be explained later.

The concave mirror 12 is a reflecting mirror for receiving and reflecting the light emitted from the light source 11 to direct the reflected light toward the display device 20. The reflection of the light is then converged on the display screen of the display device 20. The concave mirror 12 may be of a spherical type or cylindrical type.

The concave mirror 12 in this embodiment acts as a optical-path bending member for bending the light path which extends from the light source 11 to the display device 20 and is thus located at the side opposite to the light source 11 about the light path extending from the display device 20 to the eyepiece optical system 30. More specifically, the concave mirror 12 is disposed at a position so that the light path is sandwiched between the light source 11 and the concave mirror 12. The effect of the arrangement having the concave mirror 12 serving as the light path bending member will be explained later in more detail.

The first polarizer 13 is arranged to pass a desired polarized component (P polarized light in this embodiment) of the light emitted from the light source 11 to the concave mirror 12 and also pass a component, polarized identically to the just-mentioned component, of the light bent by the concave mirror 12 to the display device 20.

As the P polarized component of the light from the first polarizer 13 is received by the display device 20, its surface reflection (resulting in Fresnel loss) at the display device 20 can be minimized as compared with the S polarized component. More particularly, some of the P polarized component of the light unlike the S polarized component fall at the angles of incident (Brewster's angle) which produce zero of the reflection at the surface, thus being minimized in the energy loss. As the result, the image on the display device 20 can be protected from declination of its quality which may result from the energy loss.

The first polarizer 13 is also protected at the surface with an antireflection coating such as an antireflection film. This disallows the light from the light source 11 to be reflected on the surface of the first polarizer 13 and received by the display device 20 or to be reflected on the surface of the screen of the display device 20 and received by the eyepiece optical system 30. Accordingly, the image on the display device 20 can hardly be declined in the quality by undesired lights.

2-2. Display Device

The display device 20 is an optical modulation device having a matrix of pixels where the light emitted from the light source 11 is modified at each pixel in response to a corresponding image data thus to display the image. The display device 20 in this embodiment is of a reflection type and more specifically, of a reflective ferroelectric LCD display type which has a ferroelectric LCD panel sandwiched between two substrates and a reflecting layer (reflecting electrodes, pixel electrodes) provided on the surface of one of the two substrates.

The display device 20 is located with the long side of its four-sided display screen extending along the left-to-right direction of the viewer or the vertical direction perpendicular to the sheet of FIG. 1 and with the short side thereof parallel to the sheet of FIG. 1. As its reflective ferroelectric LCD device includes no color filter, the display device 20 is operated where each pixel is switched on and off in a time-division mode depending on each of the three primary colors of light emitted in a time-division sequence from the light source 11. Accordingly, the viewer can view the color image produced on the display device 20.

Since its substrates are made of a semiconductor material such as silicon, the display device 20 is improved in the circuit integration while minimized in the overall size. In addition, a peripheral circuit including switching elements (for example, TFT switches) for switching the pixels on and off and a pattern of wiring is mounted on the other substrate opposite to the display side substrate, whereby the aperture can easily be increased thus permitting the image to be displayed at higher brightness.

As its reflective ferroelectric LCD display is advantageously high in the driving speed, the display device 20 can employ a technique of time-division switching operation.

In a conventional color filter system, the color image is produced with the three primary colors, R, G, and B, of light passed through their respective color filters. More particularly, since each pixel is assigned to one of the three, R, G, and B color filters to receive the light emitted constantly from a while light source in a spatial division driving mode for producing a color image, the total number of the pixels may be needed three times greater than that of a monochrome image system. Also, when any unwanted portion of the image light is shielded, while the light is kept emitted from the light source, the light needs to be shielded at the relevant pixels. Since the corresponding pixel is separately shielded from the light only with much difficulty, the color filter system will be declined in the purity of each color.

The time-division driving technique, however, permits the R, G, and B emitters of the light source to be switched on and off in a time-division sequence. For instance, one color of the light can selectively be emitted from the corresponding emitter while the other two color emitters remain inactivated. As the result, the color image produced will be high in both the purity of each color and the contrast of the colors.

The reflective ferroelectric LCD display is advantageously greater in the angle of view than a TN (twisted nematic) LCD display. Even when the incident angle of light directed from the concave mirror 12 to the display device 20 is great, the image can remain high in the contrast and the color reproduction (throughout the display screen) and improved in the quality. As the illumination optical system 10 is improved in the freedom of allocating the optical elements, it can be compact in the overall size as well as high in the performance.

It is now assumed that the optical path extending from the display device 20 across the eyepiece optical system 30 to the pupil EP has a line between the center of the display screen of the display device 20 and the pupil EP of the viewer assigned as a reference axis L1. The display device 20 in this embodiment is arranged with its display screen tilting from the reference axis L1 between the display device 20 and the eyepiece optical system 30. This allows the optical path extending from the light source 11 across the concave mirror 12 to the display device 20 to be securely separated from the optical path extending from the display device 20 to the eyepiece optical system 30 without sacrificing the downsizing of the apparatus. More particularly, its detail will follow.

For example, when the incident angle of the light reflected on the concave mirror 12 and received by the display device 20 is not greater than 10 degrees, the distance between the display device 20 and the eyepiece optical system 30 needs to be wider for separation between the two optical paths, hence interrupting the downsizing of the overall apparatus. When the incident angle of the light is 60 degrees or greater, the distance between the light source 11 and the concave mirror 12 has to be increased thus interrupting the downsizing of the apparatus. Simultaneously, the surface reflection at the display device 20 will be increased thus lowering the quality of the image produced. It is hence desired that the display device 20 is determined with its incident angle θ falling in $10° < θ < 60°$.

The display device 20 may be implemented by a combination of a phase compensating plate and a TN LCD device for improving the angle of view. Alternatively, the display device 20 may be of any reflection type operable in a time-division mode, such as a DMD (digital micro-mirror device, by Texas Instruments, U.S.A.)

When the display device 20 is a DMD, the illumination optical system 10 may have to be increased in the dimensions for increasing the incident angle. For minimizing the overall dimension of the illumination optical system 10, the display device 20 is most preferable of a reflective ferroelectric LCD type as described above.

2-3. Eyepiece Optical System

The eyepiece optical system 30 is arranged for directing the image light from the display device 20 toward the pupil EP of the viewer. The eyepiece optical system 30 has an axis-asymmetric (or rotation-asymmetric, or non-axisymmetric) positive optical power where the incident image light is favorably aberration compensated. The eyepiece optical system 30 includes an eyepiece prism 31, a deflector prism 32 (See FIG. 2), the hologram optical element 33, and a second polarizer 34.

The eyepiece prism 31 is provided as a first transparent substrate for fully reflecting the incident image light received from the display device 20 to direct towards the hologram optical element 33 through which the image is projected onto the pupil of the viewer and simultaneously transmitting the external scene of light directly to the pupil of the viewer. The eyepiece prism 31 and the deflector prism 32 may be made of an acrylic resin material. The eyepiece prism 31 is formed by making a lower-end part of a parallel plate increasingly thin downward to have a wedge-like shape and making an upper-end part of the parallel plate increasingly thick upward. The eyepiece prism 31 is bonded to the deflector prism 32 by an adhesive thus to sandwich the hologram optical element 33 at the lower end therebetween.

The deflector prism 32 is arranged of a parallel plate having substantially a U shape in the plan view (See FIG. 2). The deflector prism 32 serves as a second transparent substrate and is bonded with the lower side and the two sides (both the left and right sides) of the eyepiece prism 31 thus to constitute substantially a parallel plate. Since the deflector prism 32 is bonded to the eyepiece prism 31, it prevents any distortion in the external scene received by the viewer from the eyepiece optical system 30.

More specifically, if the deflector prism 32 is not joined to the eyepiece prism 31, the eyepiece prism 31 causes the external scene of light to be refracted when passing across the lower end of the wedge shape thereof, and thereby creating unwanted distortion. If the deflector prism 32 is bonded to the eyepiece prism 31 to integrally form a substantially parallel plate, such the deflector prism 32 cancels the effect of refraction in the external scene of light which passes through the lower end of the wedge shape of the eyepiece prism 31. Accordingly, the external scene can be free from any distortion when viewed in the see-through mode.

The hologram optical element 33 in this embodiment is of a volume phase, reflection type hologram where the image produced by the display device 20 is enlarged and viewed as a virtual image by the viewer, as its function is identical to the positive power characteristic of an aspherical concave mirror. In other words, the three primary color lights of different wavelengths received from the display device 20 are diffracted by the hologram optical element 33 before directed to the pupil of the viewer.

The half amplitude of the diffracted wavelength of each color light in the hologram optical element 33 is smaller than that of (the wavelength of each color of) each other light emitted from the light source 11. Accordingly, particular (diffraction peak) wavelengths of the light emitted from the light source 11 where the diffraction efficiency is maximum in the hologram optical element 33 are reflected by the hologram optical element 33 and received by the pupil of the viewer. The dependence of the diffraction efficiency on wavelength as a primary characteristic of the hologram optical element 33 will be explained later in more detail.

The hologram optical element 33 is produced by exposing a hologram photosensitive material coated on the substrate to light. The hologram photosensitive material may be a single-layer color photo-polymer which is sensitive to all the three, R, G, and B, primary color lights. More particularly, the hologram optical element 33 is fabricated by exposing the hologram photo-sensitive material to the three, R, G, and B, colors of laser light at the same time to develop an interference pattern record, fixing the record with illumination of UV (ultraviolet) light, and baking the material for intensification.

The single-layer color photo-polymer is as simple as carrying in its single photosensitive layer a hologram record of the three, R, G, and B, primary colors. This allows the hologram optical element 33 to be fabricated easily and stably. In case that a three-layer color photo-polymer is used, required is an extra adjustment process for determining desired exposure conditions (including the amount of exposure) to optimize the diffraction efficiency and the diffraction wavelength range. The single-layer color photo-polymer needs no such an extra process and can thus be easy in the handling.

The second polarizer 34 is provided for transmitting the component of the incident light (S polarized component of the light in this embodiment), which is orthogonal in the direction of polarization to the component of the light transmitted across the first polarizer 13, to the eyepiece prism 31. In fact, the second polarizer 34 is bonded to the side of the eyepiece prism 31 where the incident light is received from the display device 20.

3. Action of Image Display Apparatus

The action of the image display apparatus 1 will now be described. Each of the three, R, G, and B, primary colors of light is emitted in a time-division mode from the light source 11 in the illumination optical system 10. The light (for example, P polarized) of the different colors is passed across the first polarizer 13 and reflected by the concave mirror 12. The light (P polarized) reflected from the concave mirror 12 is passed again across the first polarizer 13 and projected onto the display device 20.

As the incident light is reflected on the display device 20, each of the three, R, G, and B, primary colors is modified with its corresponding image data. A resultant (S polarized) light is then released from the display device 20. Meanwhile, the image of the image data is displayed in each color of the time-division mode on the display device 20. The emitting light from the display device 20 (image light of each of RGB) hence carries the image data of each color and runs across the optical path extending from the light source 11 to the concave mirror 12 before entering the eyepiece optical system 30. The light is passed across the second polarizer 34 and received by the eyepiece prism 31 in the eyepiece optical system 30.

In the eyepiece prism 31, the image light is fully reflected several times on the two opposite sides of the eyepiece prism 31 before received by the hologram optical element 33 located at the lower end of the eyepiece prism 31. The light is reflected by the hologram optical element 33 and finally received by the pupil EP of the viewer. This allows the viewer to view as an enlarged virtual image at the pupil EP the full color image of the three, R, G, and B, colors of the light produced by the display device 20.

Since the eyepiece prism 31, the deflector prism 32, and the hologram optical element 33 enable to transmit almost the entire of the external light, the external scene can be viewed in a see-through mode by the viewer. Simultaneously, the virtual image of the image produced by the display device 20 can be viewed while partially overlapping the external scene.

As described, the illumination optical system 10 in this embodiment includes the first polarizer 13 which transmits the (P polarized) light reflected on the concave mirror 12, while the eyepiece optical system 30 includes the second polarizer 34 which transmits the (S polarized) image light from the display device 20. Accordingly, even with the arrangement in which the concave mirror 12 is employed, it is possible to illuminate the display device 20 with the source light via the concave mirror 12 without fail, and thus to direct the image light from the display device 20 via the eyepiece prism 31 toward the pupil EP of the viewer.

Also, the second polarizer 34 is provided at the incident side of the eyepiece optical system 30 and can thus block any unwanted (P polarized) light directed from the light source 11 to the eyepiece prism 31. This securely prevents any unfavorable artifact of ghost or flare produced by the unwanted light.

The image display apparatus 1 in this embodiment includes the hologram optical element 33 in the eyepiece optical system 30 which acts as a combiner for directing both the image light from the display device 20 and the external scene of light to the pupil of the viewer at the same time. This allows the viewer to view both the image from the display device 20 and the external scene simultaneously via the hologram optical element 33.

The hologram optical element 33 has a positive optical power at axially asymmetry. Employing such this hologram optical element 33 allows the overall apparatus to be increased in the freedom of allocation of the optical elements, thus contributing to the downsizing of the apparatus.

4. Bending of Optical Path in Illumination Optical System

The action of bending the optical path in the illumination optical system 10 will be explained.

In this embodiment, the concave mirror 12 acts as an optical-path bending member, as shown in FIG. 1, and is located at the side opposite to the light source 11 about the optical path which extends from the display device 20 to the eyepiece optical system 30. The optical path from the light source 11 is bent, on the plane parallel to the short side of the screen of the display device 20 and vertical to the screen of the display device 20, by the action of the concave mirror 12 in order to enter the display device 20 in the illumination optical system 10. Accordingly, the ray of light (optical path) traveling from the light source 11 to the concave mirror 12 and the ray of light (optical path) traveling further on the same optical path as the just-mentioned ray of light from the display device 20 to the eyepiece optical system 30 intersect each other in the air at the outside of the eyepiece optical system 30.

It is now assumed that the line extending from the light source 11 to the center of the display device 20 is a reference line L2 along the optical path extending from the light source 11 to the display device 20. Since the concave mirror 12 is located as described, the distance along the optical path between the light source 11 and the display device 20 is increased more than that where the optical path extends from the light source 11 to the display device 20 with no bending of the reference line L2. Accordingly, without increasing the power of the illumination optical system 10 (for example, a high-power collector lens provided across the optical path), the light source 11 can be positioned close to the optical path extending from the display device 20 to the eyepiece optical system 30. As the light source 11 is not protruded towards the viewer in the layout design, the apparatus can easily be minimized in the thickness.

In addition, the light source 11 and the concave mirror 12 are located opposite to each other about the optical path which extends from the display device 20 to the eyepiece optical system 30. Accordingly, the light source 11 and the concave mirror 12 are favorably positioned so that both the distance between the light source 11 and eyepiece optical system 30 and the distance between the concave mirror 12 and the eyepiece optical system 30 are shorter than the distance between the display device 20 and the eyepiece optical system 30. As the result, the light source 11, the concave mirror 12, and the display device 20 are arranged in a compact layout adjacent to the eyepiece optical system 30, thus contributing to the downsizing of the apparatus.

Since the concave mirror 12 is positioned so that the ray of light traveling from the light source 11 to the concave mirror 12 crosses the ray of light traveling further on the same optical path as the just-mentioned light from the display device 20 to the eyepiece optical system 30, the apparatus can be decreased in the thickness or the overall directions. In particular, when the concave mirror 12 is located at the side opposite to the light source 11 about the optical path which extends from the display device 20 to the eyepiece optical system 30, the two light paths (or the two reference lines L1 and L2) intersect each other in the air, thus ensuring the foregoing advantage.

Also, since the optical path extending from the light source 11 to the concave mirror 12 is separated by the action of the concave mirror 12 from the optical path extending from the display device 20 to the eyepiece optical system 30, no PBS which is common in the prior art is needed to position at the intersection between the two optical paths for separation. Accordingly, the apparatus can be reduced in the overall weight and minimized in the production cost. The prior art using a PBS may have a drawback that the eyepiece optical system is disturbed with the illumination light as unwanted light depending on any negative performance of the PBS and thus declines the quality of the image to be viewed by a viewer. The present invention allows the separation of the optical path with no use of such a PBS, thus being free from the drawback.

It is assumed that the ray of light traveling from the light source 11 to the concave mirror 12 is a first ray of light and the ray of light traveling further on the same optical path as the first ray of light from the display device 20 to the eyepiece optical system 30 is a second ray of light. The first light and the second light in this embodiment intersect each other in the space where the medium is uniform in the refraction index but not in the interface between two mediums which are different in the refraction index. For example, when the refraction index is different between the two mediums where the first ray of light and the second ray of light cross each other, its resultant refraction will create an unwanted component of the light which is then received across the eyepiece optical system 30 by the pupil EP of the viewer, declining the quality of the image to be viewed. However, the present invention permits the first ray of light and the second ray of light to cross each other in the space where the medium is uniform in the refraction index, thus minimizing the generation of unwanted component of the light and avoiding declination in the quality of the image to be viewed.

While the medium which is uniform in the refraction index is air, the concave mirror 12 in this embodiment is located so that the first ray of light and the second ray of light cross each other in the air. Accordingly, the illumination optical system 10 can be simplified more than that of Embodiment 5 which has an illumination prism 19 (See FIG. 17) provided at the intersection between the two rays of light as will be described later. In this point of view, the apparatus will be reduced in the overall weight.

Also, since the intersection between the first ray of light and the second ray of light is positioned at the outside of the eyepiece optical system 30 in this embodiment, the second polarizer 34 is provided between the intersection and the eyepiece prism 31 in the eyepiece optical system 30. In other words, the space for installation of the second polarizer 34 is available. Because of the action of the second polarizer 34, any unwanted light (ghost) directed from the light source 11 to the eyepiece prism 31 can be blocked and the image to be viewed can be protected from quality declination.

In this embodiment, the concave mirror 12 allows the optical path in the illumination optical system 10 to be bent on the plane parallel to the short side of the screen and vertical to the screen of the display device 20. Accordingly, the optical path in the illumination optical system 10 can be separated by a short distance from the optical path extending from the display device 20 to the eyepiece optical system 30 than that of the case where the optical path in the illumination optical system 10 is bent on the plane parallel to the long side of the screen and vertical to the screen of the display device 20, hence permitting the illumination optical system 10 to be compact in the overall size.

Figure 3:
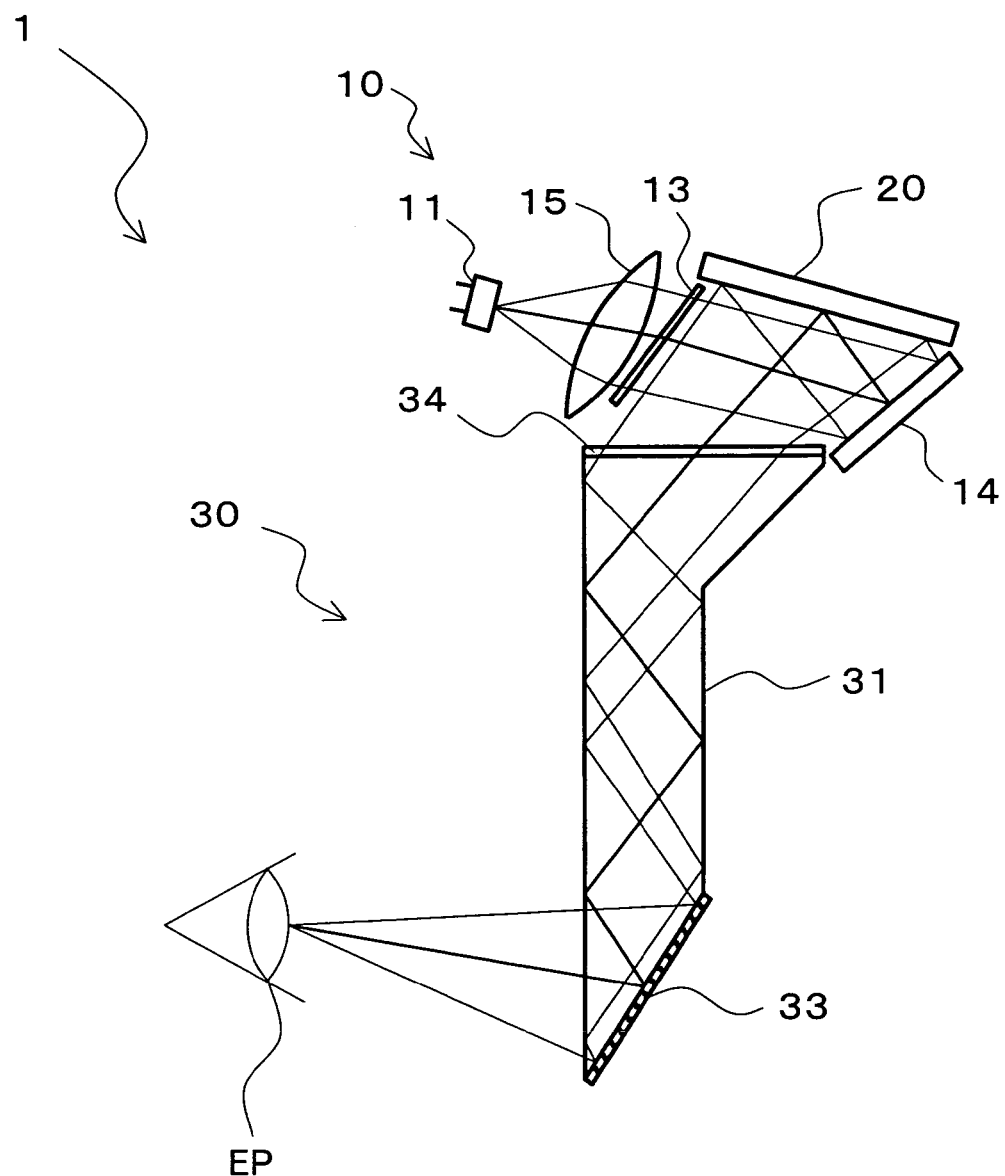
FIG. 3 is a cross sectional view showing a modification of the image display apparatus of the embodiment.

In this embodiment, the optical-path bending member is the concave mirror 12. Accordingly, the illumination optical system 10 can be simplified in the construction because such a collector lens 15, described later, as shown in FIG. 3 needs not be provided across the optical path for converging the light emitted from the light source 11 on the screen of the display device 20. Also, since the concave mirror 12 is located at the position significantly far from the light source 11 and adjacent to the display device 20 to be illuminated, the light for illumination can be used at higher efficiency and without loss.

Although the concave mirror 12 acting as the optical-path bending member is implemented by a reflective mirror in this embodiment, it may employ any other members for bending the optical path such as a prism.

5. Modifications

FIG. 3 is a cross sectional view showing a modification of the image display apparatus 1. The modified image display apparatus 1 includes a planer mirror 14 provided as the optical-path bending member and a collector lens 15 provided in front of the light source 11. The planer mirror 14 is located at the side opposite to the light source 11 about the optical path which extends from the display device 20 to the eyepiece optical system 30. The collector lens 15 and the first polarizer 13 are located at the side of the light source 11 about the optical path. This allows the light emitted from the light source 11 to be converged by the collector lens 15, passed across the first polarizer 13, and received by the planer mirror 14. The light is then reflected on the planer mirror 14 (bent at its optical path) and directed to the display device 20.

As the planer mirror 14 is used as the optical-path bending member, the collector lens 15 needs to be provided for converting the light on the screen of the display device 20. The collector lens 15 may be of either a spherical type or aspherical type. Accordingly, the illumination optical system 10 with the collector lens 15 will be less expensive than that with the concave mirror 12.

Figure 4:
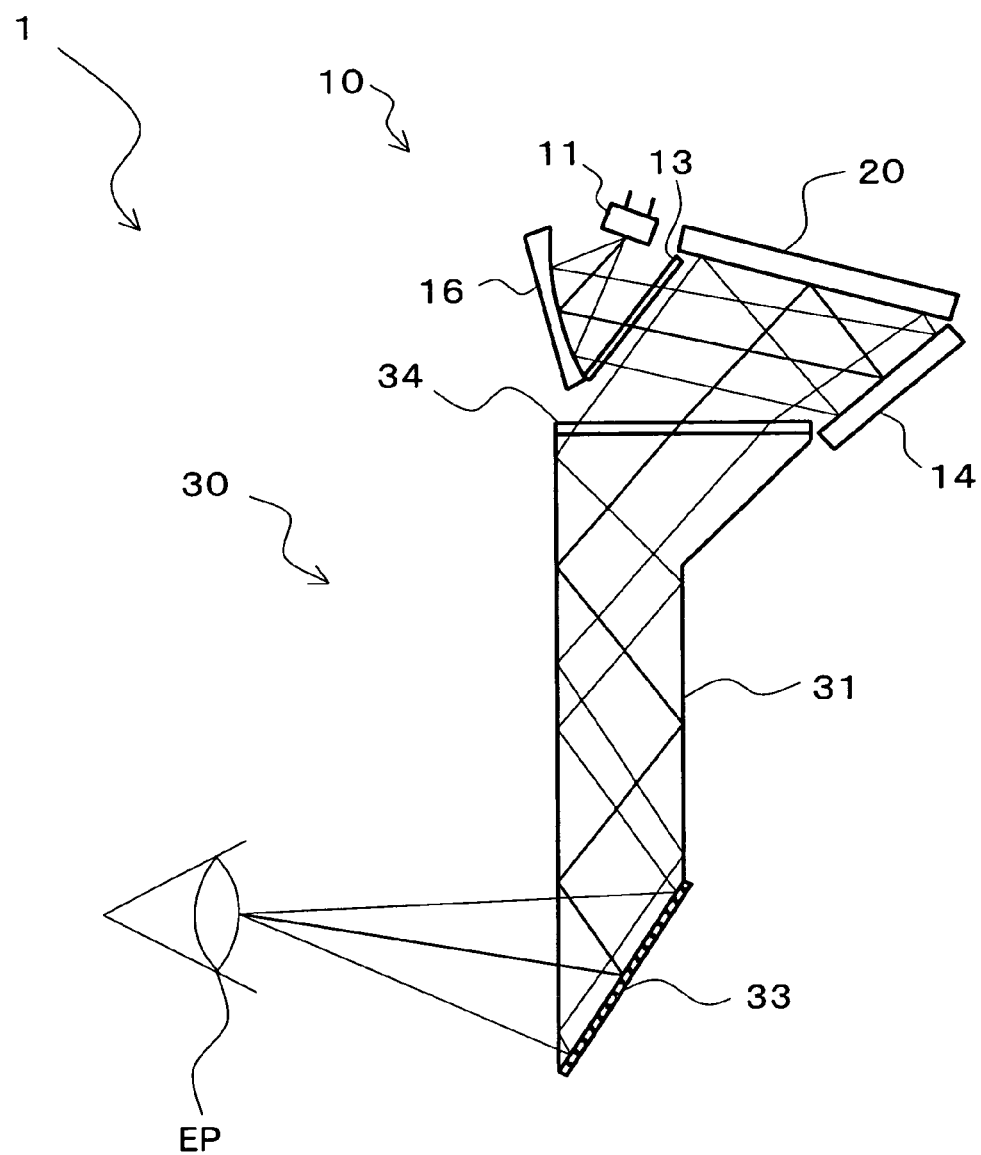
FIG. 4 is a cross sectional view showing another modification of the image display apparatus of the embodiment.

FIG. 4 is a cross sectional view showing a further modification of the image display apparatus 1. The modified image display apparatus 1 includes as the optical-path bending member a combination of a planer mirror 14 and a concave mirror 16 replacing the collector lens 15 shown in FIG. 3. The planer mirror 14 is located at the side opposite to the light source 11 about the optical path which extends from the display device 20 the eyepiece optical system 30. The concave mirror 16 and the first polarizer 13 are located at the side of the light source 11 about the optical path. In action, the light emitted from the light source 11 is reflected by the concave mirror 16, passed across the first polarizer 13, and received by the planer mirror 14. A reflection of the light from the planer mirror 14 is then directed to the display device 20.

Since the optical path extending from the light source 11 to the display device 20 is bent by the two optical elements (the concave mirror 16 and the planer mirror 14), the apparatus is fabricated in such a favorable layout arrangement that the light source 11 and the display device 20 are located on the same plane. This permits the light source 11 and the display device 20 to be mounted on a common substrate, thus decreasing the number of the other members than the optical elements.

6. Advantage of Increasing Color Reproduction

In this embodiment, the diffraction wavelength range of the R, G, and B color lights in the hologram optical element is favorably determined according to the wavelength range of the R, G, and B colors of light emitted from the light source, whereby the color reproduction is increased in the range for improving the quality of images produced on a display device operated in a time-division operation mode and viewed by a viewer. More specifically, in the image display apparatus 1 of this embodiment which employs an RGB combined LED as the light source 11 together with the hologram optical element 33, the color reproduction can be expanded in the range. This will be explained in more detail.

6-1. Characteristics of Hologram Optical Element

Figure 5:
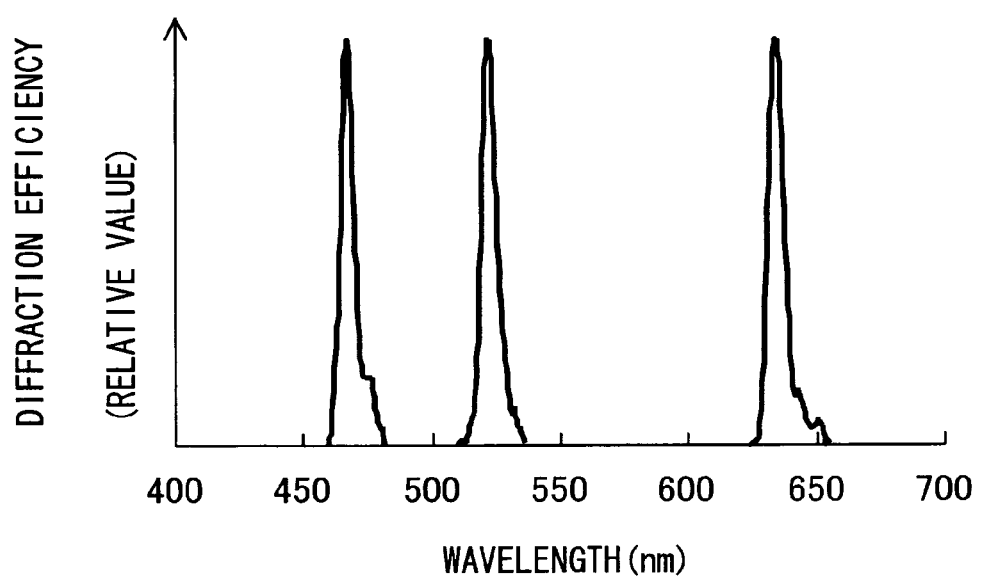
FIG. 5 is an explanatory diagram showing the dependence of diffraction efficiency to wavelength in a hologram optical element of a reflective type.
Figure 6:
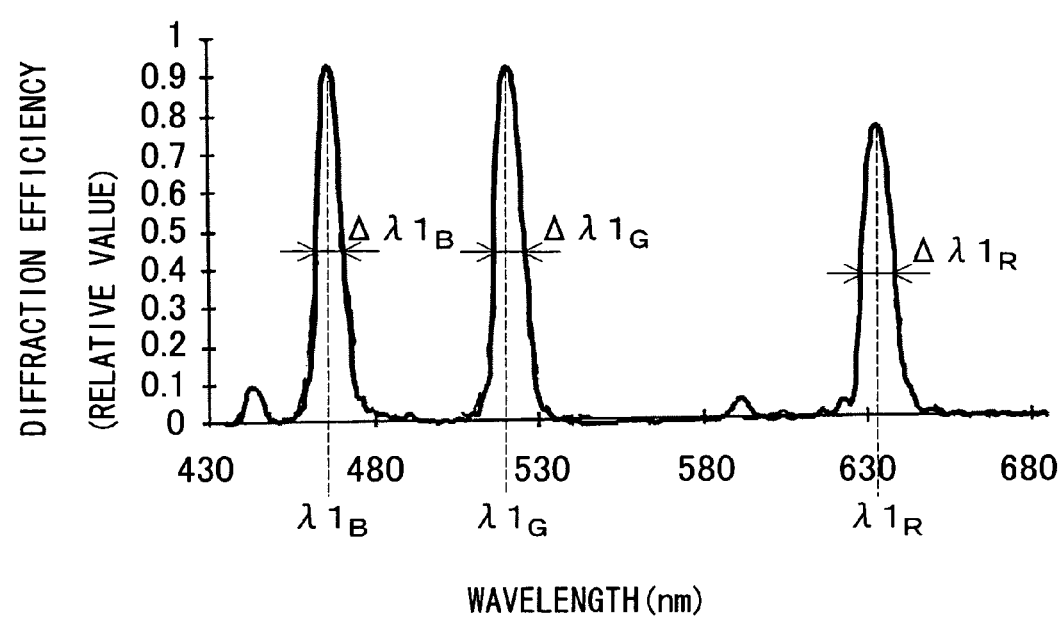
FIG. 6 is an explanatory diagram showing the dependence of diffraction efficiency to wavelength in a hologram optical element of another type.

FIG. 5 is an explanatory diagram showing the dependence of the diffraction efficiency on the wavelength in the hologram optical element 33. FIG. 6 is an explanatory diagram showing the dependence of the diffraction efficiency on the wavelength in a modification of the hologram optical element 33. The modified hologram optical element 33 shown in FIG. 6 is differentiated from the hologram optical element 33 shown in FIG. 5 by the fact that the condition (for example, the amount of exposure) for exposing the hologram photo-sensitive material to light is changed. The diffraction efficiency shown in FIG. 5 presents a relative rate when the maximum of the diffraction efficiency of the B light is 100. Also, the diffraction efficiency shown in FIG. 6 presents a relative rate when the maximum of the diffraction efficiency of each of the R, G, and B color lights is 1.

Both the hologram optical elements 33 shown FIGS. 5 and 6 have angle selectiveness and wavelength selectiveness for diffraction (reflection) of three different wavelengths of the light incident at a particular angle, 465±5 nm (B color), 521±5 nm (G color), and 634±5 nm (R color), at the peak wavelength at the diffraction efficiency and the wavelength range at half of the diffraction efficiency.

More particularly, the peak wavelength $\lambda 1_B$ at the diffraction efficiency of the B color light is 465 nm, the peak wavelength $\lambda 1_G$ at the diffraction efficiency of the G color light is 521 nm, and the peak wavelength $\lambda 1_R$ at the diffraction efficiency of the R color light is 634 nm. Also, the wavelength range $\Delta\lambda 1_B$ at half of the diffraction efficiency of the B color light is 10 nm, the wavelength range $\Delta\lambda 1_G$ at half of the diffraction efficiency of the G color light is 10 nm, and the wavelength range $\Delta\lambda 1_R$ at half of the diffraction efficiency of the R color light is 10 nm. The diffraction wavelength ranges are determined in reference with the wavelengths of the B, G, and R colors of the light emitted from the light source 11 as will be explained later.

The peak wavelength at the diffraction efficiency represents a wavelength when the diffraction efficiency is peaked out. The wavelength range at half of the diffraction efficiency presents a wavelength range when the diffraction efficiency is a half the peak value.

As described, the hologram optical element 33 is arranged for diffracting a desired wavelength of the light incident at the particular angle and thus providing no effect on the transmission of the external scene of light. This allows the viewer to view normally the external scene through the deflector prism 32, the hologram optical element 33, and the eyepiece prism 31.

6-2. Characteristics of Light Source

Figure 7:
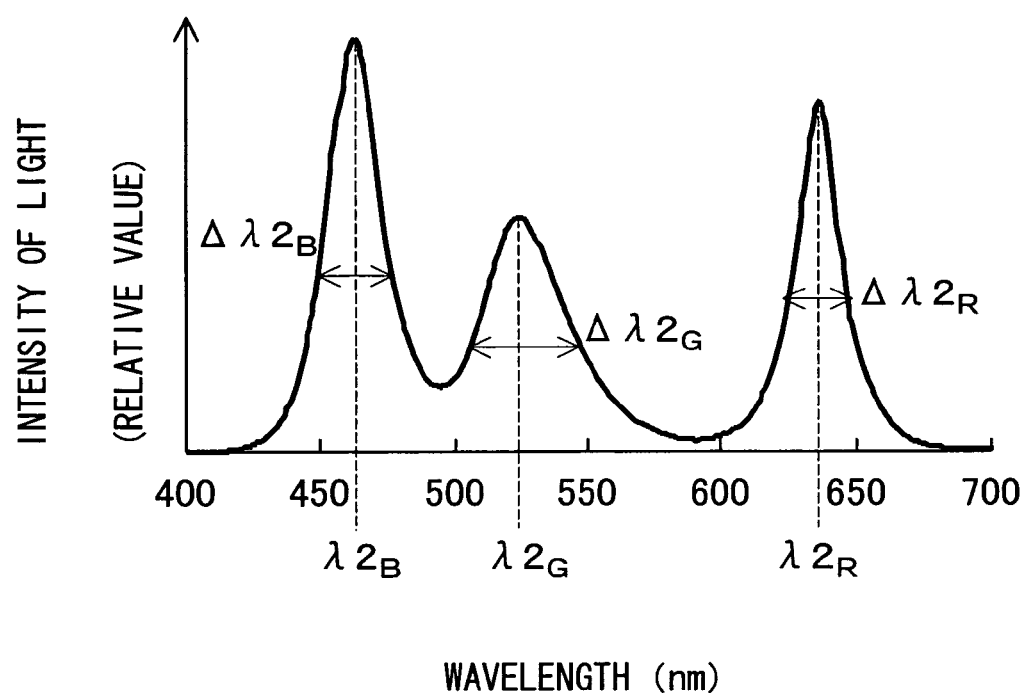
FIG. 7 is an explanatory diagram showing the spectral intensity of a light source.

FIG. 7 is an explanatory diagram showing the relationship between the wavelength of an output light and the intensity of the light or the spectral intensity characteristic of the light source 11. The intensity of the light shown in FIG. 7 represents a relative level when the maximum of the intensity of the B color light is 100. The light source 11 may be an RGB combined LED which emits three different wavelengths of the light, 462±12 nm, 525±17 nm, and 635±11 nm, at the peak wavelength of the light intensity and the wavelength range at half of the light intensity.

More specifically, when the peak wavelengths at the intensity of the three, B, G, and R, primary colors of the light emitted from the light source 11 are $\lambda 2_B$, $\lambda 2_G$, and $\lambda 2_B$, expressed are $\lambda 2_B$=462 nm, $\lambda 2_G$=525 nm, and $\lambda 2_B$=635 nm. Also, when the wavelength ranges at half the intensity of the three, B, G, and R, primary colors of the light emitted from the light source 11 are $\Delta\lambda 2_B$, $\Delta\lambda 2_G$, and $\Delta\lambda 2_B$, established are $\Delta\lambda 2_B$=24 nm, $\Delta\lambda 2_G$=34 nm, and $\Delta\lambda 2_R$=22 nm.

The peak wavelength at the intensity represents a wavelength when the intensity is peaked out. The wavelength range at half at the intensity represents a wavelength range when the intensity is a half the peak value.

6-3. Relationship Between $\Delta\lambda 1$ and $\Delta\lambda 2$

As described, the relationship between the wavelength range $\Delta\lambda 1$ ($\Delta\lambda 1_B$, $\Delta\lambda 1_G$, and $\Delta\lambda 1_R$) at half of the diffraction efficiency of each of the three, R, G, and R, primary colors of the light in the hologram optical element 33 and the wavelength range $\Delta\lambda 2$ ($\Delta\lambda 2_B$, $\Delta\lambda 2_G$, and $\Delta\lambda 2_R$) at half of the intensity of each of the three, R, G, and R, primary colors of the light emitted from the light source 11 is expressed by:

$$\Delta\lambda 1 < \Delta\lambda 2$$

in this embodiment. More particularly, $$\Delta\lambda 1_B < \Delta\lambda 2_B, \Delta\lambda 1_G < \Delta\lambda 2_G, \text{ and } \Delta\lambda 1_R < \Delta\lambda 2_R$$

are satisfied at the same time.

Since the light source 11 and the hologram optical element 33 are used having the above characteristics, a desired wavelength in the B, G, and R colors of the light emitted from the light source 11 can be diffracted by the hologram optical element 33 before received by the viewer. Accordingly, when the display device 20 (ferroelectric LCD device) is driven in a time-division mode as in this embodiment, each of the three, B, G, and R, primary colors of light can be improved in the purity. Also, the color reproduction in the image to be viewed can be increased wider than that determined from the light directly emitted from the light source 11.

Figure 8:
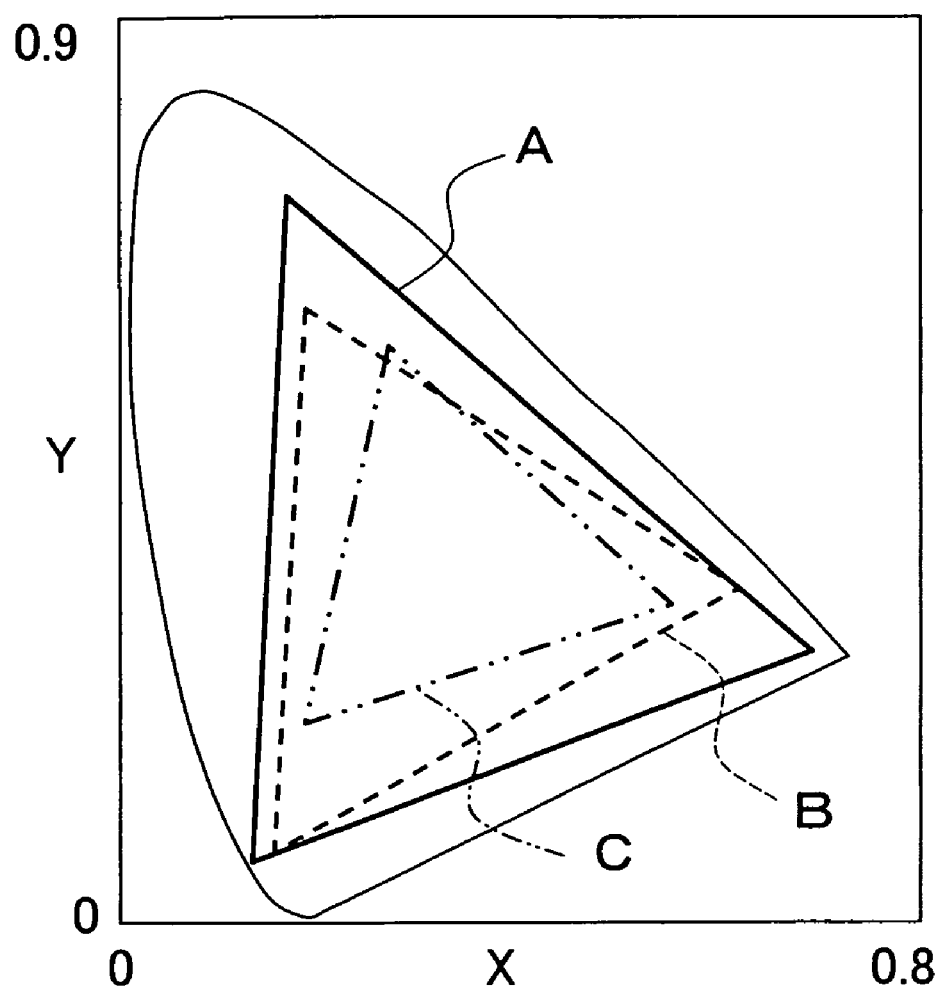
FIG. 8 is an explanatory diagram showing profiles of the color reproduction area in XY color coordinates of XYZ color specification.

FIG. 8 illustrates profiles of the color reproduction area at XYZ color specification in the XY color coordinates. The profiles of the color reproduction area in different image display apparatuses are denoted by the solid line A, the broken line B, and the dash-dot-dot line C respectively. The color reproduction area denoted by the solid line A is produced by the image display apparatus 1 of this embodiment which includes the light source 11 of an integrated RGB three-in-one LED (for example, an NSCM315C model made by Nichia Chemical), the display device 20 of a reflective, ferroelectric LCD device (for example, made by Displaytec), and the hologram optical element 33.

The color reproduction area denoted by the broken line B is produced by another image display apparatus which includes the integrated RGB three-in-one LED of the light source 11, a reflective, ferroelectric LCD device of the display device 20, and a common eyepiece optical system excluding the reflective hologram optical element. Such a common eyepiece optical system excluding the reflective hologram optical element may be a free-surface prism 35 (See FIG. 12) in Embodiment 2 which will be explained later in more detail.

The color reproduction area denoted by the dash-dot-dot line C is produced by a further image display apparatus which includes an integrated RGB three-in-one LED of the light source 11 and a reflective LCD device of the display device 20 equipped with color filters.

As apparent from the diagram, the color reproduction areas become greater in the size from the dash-dot-dot line C to the broken line B and the solid line A. The color reproduction area denoted by the solid line A is the first while the color reproduction area denoted by the broken line B is the second. As described, the ferroelectric LCD device produces images at higher contrast even when its incident light is rather great in the incident angle. Using a combination of the display device 20 of a reflective, ferroelectric LCD type and the illumination optical system 10 of a compact type, the image display apparatus 1 of this embodiment can favorably be small in the size and high in the image quality. In particular, the display device 20 of a reflective, ferroelectric LCD type can ensure a higher level of the color reproduction (a grater size of the color reproduction area) as denoted by the solid line A or the broken line B.

The hologram optical element 33 has wavelength selectiveness. When the hologram optical element 33 is used in the eyepiece optical system 30, the spectral intensity of the image light may be calculated by multiplying the spectral intensity of the light source 11 by the diffraction efficiency of the hologram optical element 33. Accordingly, the RGB combined light source 11 and the hologram optical element 33 in a combination can further increase the purity of each of the B, G, and R colors, widen the color reproduction area, and improve the quality of the image to be viewed by the viewer.

Figure 9:
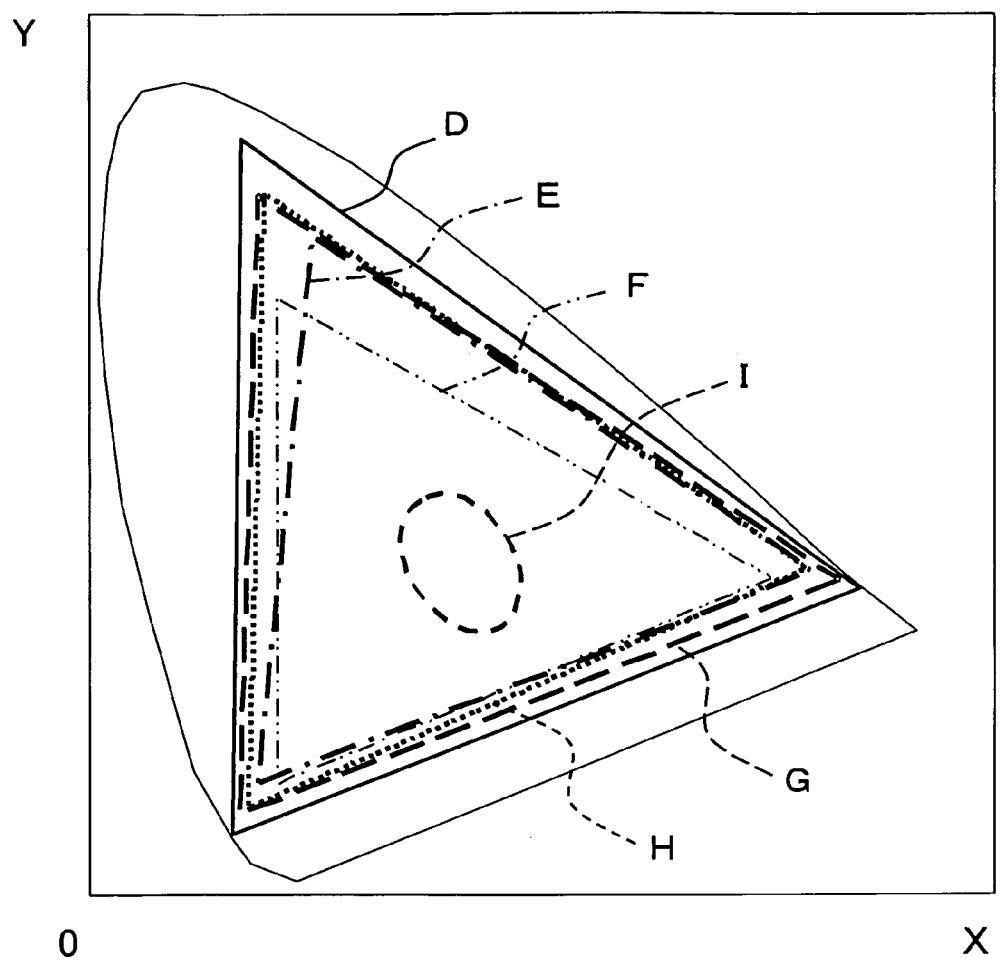
FIG. 9 is an explanatory diagram showing other profiles of the color reproduction area in XY color coordinates of XYZ color specification.

FIG. 9 illustrates other profiles of the color reproduction area at XYZ color specification in the XY color coordinates. The color reproduction area denoted by the solid line D is produced by the image display apparatus 1 of this embodiment. The color reproduction area denoted by the dash-dot line E is produced by an reflective, ferroelectric LCD device while the color reproduction area denoted by the dash-dot-dot line F is produced by an image display apparatus including a LCD device equipped with color filters. The color reproduction area denoted by the broken line G is produced by an image display apparatus 1 of Embodiment 6 which will be described later (where the hologram optical element 33 is fabricated using an RGB three-layer color photo-polymer). Also denoted by the broken like H is the color reproduction area produced by another apparatus of Non-Patent Document 1.

As apparent from the diagram, the color reproduction area produced by the image display apparatus 1 of this embodiment is the best and greater in the size than that of the image display apparatus with the color filter type display device. Accordingly, the image display apparatus 1 of this embodiment can provide the images of higher quality to be viewed by the viewer.

As described, the hologram optical element 33 in this embodiment is fabricated by exposing the hologram photo-sensitive material of single-layer color photo-polymer to light. The single-layer color photo-polymer may be unfavorable to increase the diffraction efficiency due to the mutual action between the B, G, and R colors of light in the photo-sensitive layer but favorable to minimize the wavelength range $\Delta\lambda 1$ ($\Delta\lambda 1_B$, $\Delta\lambda 1_G$, $\Delta\lambda 1_R$) at half of the diffraction efficiency of each of the three primary colors of light.

On the other hand, when the hologram photo-sensitive material of the hologram optical element is a three-layer color photo-polymer material where three layers are placed one over another which are sensitive to the three primary colors respectively, its hologram record is developed at one particular wavelength in each layer and fails to generate the mutual action between the different colors thus permitting the diffraction efficiency at each color to be increased. Accordingly, when the common method of fabricating a hologram optical element is simply employed involving the step of exposing the hologram photo-sensitive material to light before baking the same for ensuring an optimum of the diffraction efficiency, the diffraction efficiency of the B, G, and R colors of light will be somehow limited and found optimum throughout a wider wavelength range. In other words, the wavelength range at half of the diffraction efficiency of each of the three, B, G, and R, primary colors of light will unfavorably be increased.

However, since the hologram optical element 33 in this embodiment is fabricated using a single-layer color photo-polymer as the hologram photo-sensitive material, its wavelength range $\Delta\lambda 1$ ($\Delta\lambda 1_B$, $\Delta\lambda 1_G$, $\Delta\lambda 1_R$) at half of the diffraction efficiency of each of the three primary colors of light can be minimized with ease, and it is possible to facilitate the fabrication of the hologram optical element 33 satisfying the relationship $\Delta\lambda 1 < \Delta\lambda 2$ at each color. In particular, the light source is commonly used in which the spectral intensity of the R color of light is acute (i.e., the wavelength range at half of the R color light intensity is narrow). With the use of such a type of the light source, this embodiment enables to establish $\Delta\lambda 1 < \Delta\lambda 2$ at each of the B, G, and R colors. As the result, the color reproduction area can be increased easily and certainly with the display device 20 of a time-division operation type.

As the hologram optical element 33 is determined with $\Delta\lambda 1$ set smaller than $\Delta\lambda 2$, its see-through characteristic can be improved because the wavelength range of the external light passing through the hologram optical element 33 is increased. Accordingly, the image display apparatus of this embodiment is improved in the color reproduction area and the see-through characteristic, hence acting as a high-quality see-through display and ensuring to provide each viewer with the image of higher quality together with the external scene of clarity.

6-4. Range of $\Delta\lambda 1$ and $\Delta\lambda 1/\Delta\lambda 2$

In this embodiment, $\Delta\lambda 1_B = \Delta\lambda 1_G = \Delta\lambda 1_R = 10$ nm is given for the three, B, G, and R, primary colors of light. Since each of the B, G, and R colors is also established $\Delta\lambda 1 < 20$ nm, it is significantly improved in the color purity and its color reproduction in the image to be viewed can be widened. In particular, this embodiment ensures $\Delta\lambda 1 \leq 10$ nm at each of the B, G, and R colors and can thus be improved in the color purity as shown in FIGS. 8 and 9 where the color reproduction area in the image to be viewed are increased explicitly.

If $\Delta\lambda 1$ is not higher than 3 nm, the hologram optical element 33 may be decreased in the diffraction wavelength range while remains widen in the color reproduction area. This will decline the efficiency of use of the light emitted from the light source 11 and dim the image to be viewed. For permitting no declination in the brightness and increasing the color reproduction area in the image, it is desired to have $\Delta\lambda 1 > 3$ nm at each of the B, G, and R colors. More specifically, established are $\Delta\lambda 1_B > 3$ nm, $\Delta\lambda 1_G > 3$ nm, and $\Delta\lambda 1_R > 3$ nm.

When the ratio between $\Delta\lambda 1$ and $\Delta\lambda 2$ is determined in a favorable range, other than determining $\Delta\lambda 1$ (the absolute) so as to satisfy $\Delta\lambda 1 < \Delta\lambda 2$, the relationship between the brightness and the color reproduction area can favorably be balanced.

For example, the color reproduction area can be increased when $\Delta\lambda 1/\Delta\lambda 2$ is not greater than $1/10$ at each of the B, G, and R colors of light. This however declines the diffraction wavelength range in the hologram optical element 33 in relation to the wavelength range of the light emitted from the light source 11, hence disabling to provide the image at a higher brightness. When $\Delta\lambda 1/\Delta\lambda 2$ is 1 or higher for light of each of the B, G, and R colors, the image to be viewed can be increased in the brightness but fails to widen the color reproduction area.

It is hence desired to have $1/10 < \Delta\lambda 1/\Delta\lambda 2 < 1$ at each of the B, G, and R colors of light. More specifically, $1/10 < \Delta\lambda 1_B/\Delta\lambda 2_B < 1$, $1/10 < \Delta\lambda 1_G/\Delta\lambda 2_G < 1$, and $1/10 < \Delta\lambda 1_R/\Delta\lambda 2_R < 1$ are desired for having both satisfied levels of the brightness and the color reproduction area in the image to be viewed in consideration with $\Delta\lambda 2$.

7. Relationship Between $\lambda 1$, $\Delta\lambda 2$, and $\lambda 2$

The hologram optical element 33 in this embodiment is arranged where the peak wavelength $\lambda 1$ ($\lambda 1_B$, $\lambda 1_G$, $\lambda 1_R$) at the diffraction efficiency falls in a wavelength range of $\Delta\lambda 2$ ($\Delta\lambda 2_B$, $\Delta\lambda 2_G$, $\Delta\lambda 2_B$) at half of the intensity of the light emitted from the light source 11. More particularly, $\lambda 1_B$ (465 nm) is in a wavelength range of $\Delta\lambda 2_B$ (450 to 474 nm), $\lambda 1_G$ (521 nm) is in a wavelength range of $\Delta\lambda 2_G$ (508 to 542 nm), and $\lambda 1_R$ (634 nm) is in a wavelength range of $\Delta\lambda 2_B$ (624 to 646 nm).

In this case, the peak wavelength $\lambda_1$ ($\lambda 1_B$, $\lambda 1_G$, $\lambda 1_R$) at the diffraction efficiency of each of the B, G, and R colors of light in the hologram optical element 33 is comparatively close to the peak wavelength $\lambda 2$ ($\lambda 2_B$, $\lambda 2_G$, $\lambda 2_R$) at the intensity of the light emitted from the light source 11. This is also explained from $\Delta\lambda 2_B = 462$ nm, $\lambda 2_G = 525$ nm, and $\lambda 2_R = 635$ nm. As a result, a wavelength range at a higher intensity of the light emitted from the light source 11 can selectively be diffracted in the hologram optical element 33 at high efficiency before received by the pupil of the viewer. Hence, the image to be viewed by the viewer can be improved in the brightness as the efficiency of use of the light emitted from the light source 11 has been increased.

In this embodiment, $\lambda 1$ at each of the B, G, and R colors of light remains in a range of $\lambda 2 \pm 20$ nm. More specifically, expressed by $\lambda 1_B$ (465 nm)=$\lambda 2B$ (462 nm)$\pm 20$ nm, $\lambda 1_G$(521 nm)=$\lambda 2_G$ (525 nm)$\pm 20$ nm, and $\lambda 1_R$ (634 nm)=$\lambda 2_R$ (635 nm)$\pm 20$ nm. Accordingly, this allows the peak wavelength $\lambda 1$ ($\lambda 1_B$, $\lambda 1_G$, $\lambda 1_R$) at the diffraction efficiency of each of the B, G, and R colors of light in the hologram optical element 33 to be significantly close to the peak wavelength $\lambda 2$ ($\lambda 2_B$, $\lambda 2_G$, $\lambda 2_R$) at the intensity of the light emitted from the light source 11, thus increasing the efficiency of use of the light emitted from the light source 11 and providing the image at higher brightness to be viewed by a viewer.

8. Adjustment of Diffraction Efficiency Over Intensity

The area denoted by the broken line I in FIG. 9 represents a target area of white color for adjusting the color balance of the B, G, and R colors. The target area has substantially an oval shape of which the center is expressed by (X, Y)= (0.32±0.05, 0.33±0.05) in the XY color coordinates. For optimizing the exposure conditions (including amount of exposure of light) and the post-process conditions (including baking temperature and baking duration) so that the white color developed when the B, G, and R color emitters of the light source 11 all are driven at the maximum remains in the target area, the hologram optical element 33 is modified in the maximum of the diffraction efficiency at the wavelength of each color. As the result, the image display apparatus 1 can be improved in the efficiency of use of the light, thus providing the image of higher quality to be viewed. This will be explained in more detail.

As shown in FIG. 7, the ratio of the intensity (peak value) of the light emitted from the light source 11 between the three, B, G, and R, primary colors is substantially 10:5:8. In this case, the hologram optical element 33 is fabricated by optimizing the exposure conditions and the post-process conditions so as to obtain the ratio of the diffraction efficiency (peak value) at the hologram optical element 33 between the B, G, and R colors is 95:85:50. Since the G color of the light which is higher in the visibility becomes lower than the B and R colors in the intensity of the light emitted from the light source 11, its diffraction efficiency in the hologram optical element 33 is set to a higher level. On the other hand, the B and R colors of the light are properly determined in the diffraction efficiency in the hologram optical element 33 in reference to their intensity at the light source 11 so that the three, B, G, and R, primary colors are balanced at optimum.

With the hologram optical element 33 modified where the diffraction efficiency of the B, G, and R colors of light is determined in reference to the intensity levels of the B, G, and R colors of the light emitted from the light source 11, the image to be viewed by a viewer can be improved in the brightness as well as the color balance between the three primary colors without increasing the energy of the light emitted from the light source 11. In other words, the image to be viewed by the viewer can be enhanced in the quality while the power consumption of the light source 11 remains unchanged.

With the hologram optical element 33 having the above settings of the diffraction efficiency, the B color of light may be higher in the product of the diffraction efficiency and the intensity of the light emitted from the light source 11 than the G and R colors. This is determined from the fact that the visibility of the B color is rather low. The color balance is examined from the product of the visibility of each color and the sum (integration) of the intensity in the wavelength range of each color to be received by the pupil. Hence, the color balance in the image to be viewed can be improved through optimizing the diffraction efficiency in reference to the visibility of the B, G, and R colors of light.

9. Shift of Intensity Peak in Optical Pupil

Figure 10:
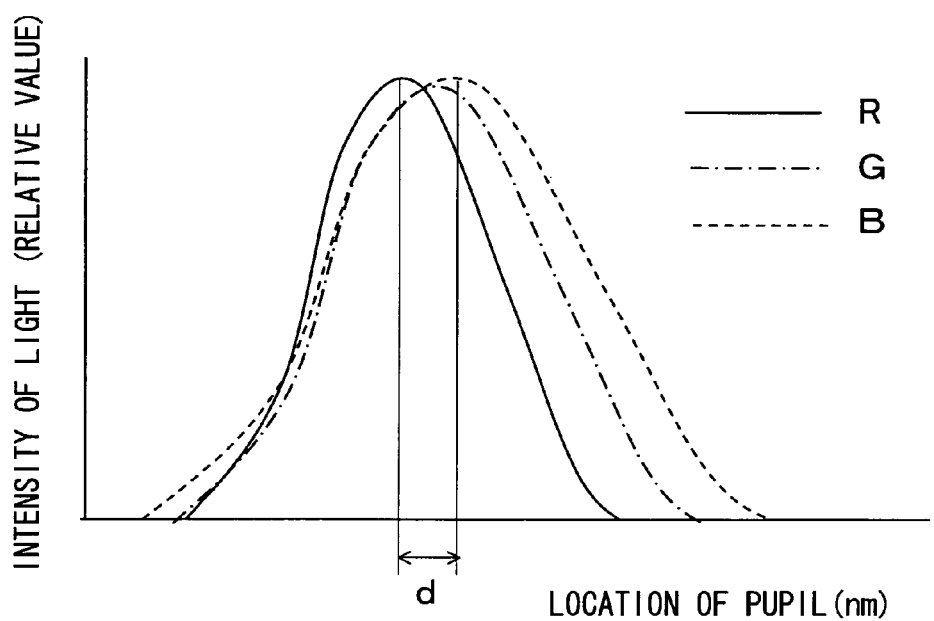
FIG. 10 is an explanatory diagram showing a change in the intensity of light at each of the three primary colors depending on the location of the optical pupil.

FIG. 10 is an explanatory diagram showing a change in the intensity of each of the B, G, and R colors of light throughout the optical pupil EP. The pupil along the horizontal axis in FIG. 10 represents measurements along the upward and downward directions of the HMD shown in FIG. 2 (in the vertical direction of the image display apparatus 1 shown in FIG. 1).

When the peak of the intensity of one of the B, G, and R colors is shifted from those of the other colors in the optical pupil EP as shown, they may step out from the eyes of the viewer moving along the vertical direction. For example, when the eyes of the viewer are significantly moved along the horizontal axis in FIG. 10, depending on the amount of the movement, the peak of the intensity deviates from the viewer's eyes. This causes the viewer to sense a color shading in the image.

It is hence desired that the difference d (regardless of the direction) in the peak of the intensity between the B, G, and R colors in the optical pupil EP is not greater than 1 mm since the diameter of the pupil of the viewer is commonly not smaller than 2 mm. Accordingly, even if the pupil of the view moves out from the optical pupil EP, the peak of the intensity in the image will be protected from being out of the pupil of the viewer. As the result, it is possible to suppress occurrence of the color shading in the image sensed by the viewer.

10. Other Arrangements of Hologram Optical Element

As described, the hologram optical element 33 is fabricated by exposing its hologram photosensitive material provided on a substrate to light. The hologram photosensitive material may be a three-layer color photo-polymer. The three-layer color photo-polymer may be constituted from a lamination of three layers arranged sensitive to the three, B, G, and R, primary colors of light.

Figure 11:
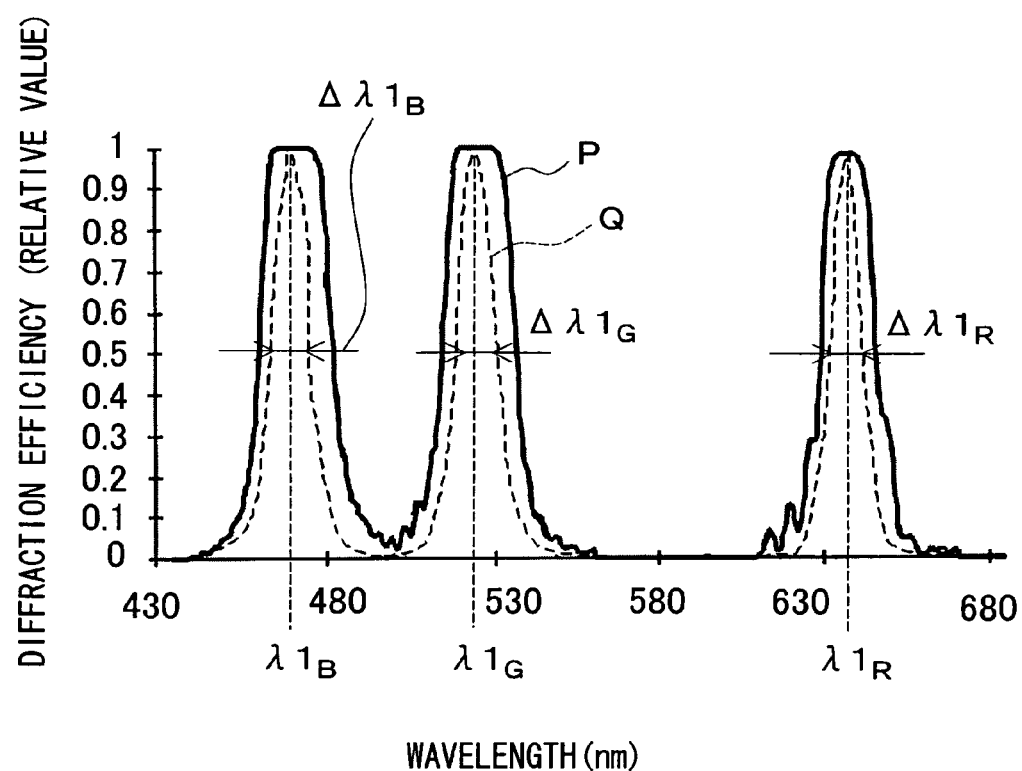
FIG. 11 is an explanatory diagram showing the dependence of diffraction efficiency to wavelength in a hologram optical element of a further type.

FIG. 11 is an explanatory diagram showing the dependence of the diffraction efficiency on the wavelength in the hologram optical element 33 fabricated with the three-layer color photo-polymer. The diffraction efficiency of each of the B, G, and R colors of light shown in FIG. 11 is expressed by a relative value when its maximum is 1. Denoted by the solid line P in FIG. 11 is a profile of the dependence of the diffraction efficiency on the wavelength in the hologram optical element 33 which has been fabricated under the normal exposure and post-process conditions including R:G:B=60:25:25 in the exposure of light (mJ/cm$^2$), 120° C. of the baking temperature, and 2 hours of the baking duration. Also, denoted by the broken line Q in FIG. 11 is a profile of the dependence of the diffraction efficiency on the wavelength in another hologram optical element 33 which has been fabricated under desired exposure and post-process conditions including R:G:B=15:7:7 in the exposure of light (mJ/cm$^2$), 120° C. of the baking temperature, and 3 hours of the baking duration.

When the hologram optical element 33 is fabricated under the common exposure and post-process conditions using the three-layer color photo-polymer as its hologram photosensitive material, the diffraction efficiency of each color can be increased as denoted by the solid line P in FIG. 11. Accordingly, for improving the efficiency of use of the light emitted from the light source 11, the hologram optical element 33 is fabricated preferably using the three-layer color photo-polymer which is higher in the diffraction efficiency than the single-layer color photo-polymer.

However, in the hologram optical element 33 fabricated under the common exposure and post-process conditions for optimizing the diffraction efficiency, the wavelength range at half of the diffraction efficiency exceeds 20 nm and becomes too wide as denoted by the solid line P. This may disturb the relationship of $\Delta\lambda 1 < \Delta\lambda 2$ or other requirements.

For compensation, the hologram optical element 33 having a characteristic denoted by the broken line Q is fabricated under modified exposure and post-process conditions. With this, the wavelength range ($\Delta\lambda 1$) at half of the diffraction efficiency of each of the B, G and R colors of light remains not greater than 20 nm in the hologram optical element 33 while $\Delta\lambda 1 < \Delta\lambda 2$ is satisfactorily given.

In fact, as the result of fabricating the hologram optical element 33 fabricated under the modified conditions, the hologram optical element 33 demonstrates the following characteristics: three wavelength ranges of the light, 465±7 nm (the B light), 521±7 nm (the G light), and 634±7 nm (the R light), can be diffracted (reflected) through the peak wavelength at the diffraction efficiency and the wavelength rage at half of the diffraction efficiency. More particularly, the peak wavelength $\lambda 1_B$ at the diffraction efficiency of the B color of light is 465 nm, the peak wavelength $\lambda 1_G$ at the diffraction efficiency of the G color of light is 521 nm, and the peak wavelength $\lambda 1_R$ at the diffraction efficiency of the R color of light is 634 nm. The wavelength range $\Delta\lambda 1_B$ at half of the diffraction efficiency of the B color of light is 14 nm, the wavelength range $\Delta\lambda 1_G$ at half of the diffraction efficiency of the G color of light is 14 nm, and the wavelength range $\Delta\lambda 1_R$ at half of the diffraction efficiency of the R color of light is 14 nm.

With the hologram optical element 33 having the characteristic denoted by the broken line Q, the image display apparatus 1 can produce a color reproduction area denoted by the broken line G in FIG. 9 which is greater in the size than the color reproduction area (denoted by the dash-dot line E in FIG. 9) produced by a reflective, ferroelectric LCD device. Accordingly, when the hologram optical element 33 is fabricated with the three-layer color photo-polymer, the color reproduction area can be enlarged by optimizing the exposure and post-process conditions.

In general, the method of decreasing the wavelength range at half of the diffraction efficiency (decreasing the diffraction efficiency) in the hologram optical element 33 may be classified into two techniques, decreasing the exposure of light and lowering the baking temperature (or shortening the baking duration). The former is preferred for stabling controlling the diffraction efficiency and the wavelength range at half of the diffraction efficiency. In this respect, for fabricating the hologram optical element 33 from the three-layer color photo-polymer, the exposure of light can preferably be optimized to controllably determine the wavelength range at half of the diffraction efficiency.

Embodiment 2

Another embodiment of the present invention will be described referring to the relevant drawings. For ease of the description, like elements are denoted by like numerals as those of Embodiment 1 and will be explained in no more detail.

Figure 12:
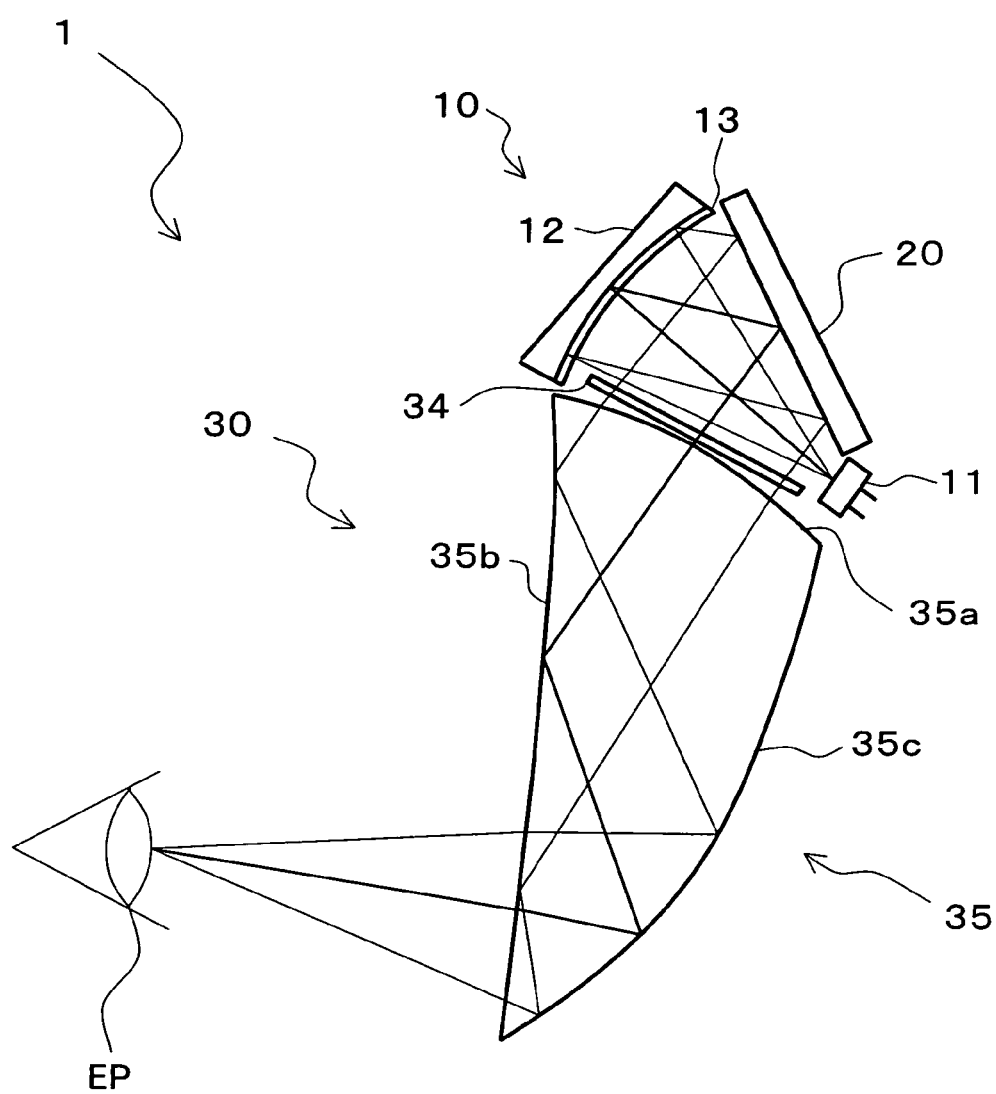
FIG. 12 is a cross sectional view schematically showing an arrangement of an image display apparatus according to another embodiment of the present invention.

FIG. 12 is a cross sectional view schematically showing an arrangement of an image display apparatus 1 of this embodiment. In this embodiment, the eyepiece optical system 30 includes a free-surface prism 35 which replaces the eyepiece prism 31 in Embodiment 1.

The free-surface prism 35 has a first surface 35a thereof provided as the incident surface for receiving an image light from the display device 20, a second surface 35b thereof provided at the viewer pupil EP side for acting as the full reflection/transmission surface, and a third surface 35c thereof provided as the reflecting surface to face the second surface 35b. The three surfaces are arranged of an aspherical shape at non-rotating symmetry. The first surface 35a is arcuately tilted so that its end at the third surface 35c stays lower than the other end at the second surface 35b.

The free-surface prism 35 permits the image light entering the first surface 35a to be positively reflected by the second surface 35b and then by the third surface 35c and passed across the second surface 35b before received by the pupil EP of a viewer. With the free-surface prism 35 which replaces the eyepiece prism 31 in Embodiment 1, the apparatus like that of Embodiment 1 can equally provide an virtual enlarged image at the front of the eyes of the viewer.

In this embodiment, the optical elements in the illumination optical system 10 are allocated in relation to the first surface 35a of the free-surface prism 35. More specifically, the light source 11 is located at the side opposite to the viewer about the optical path which extends form the display device 20 to the eyepiece optical system 30. The concave mirror 12 and the first polarizer 13 are located at the viewer side opposite to the light source 11 about the optical path. With the above arrangement of each optical element in the illumination optical system 10, even when the free-surface prism 35 is employed, the illumination optical system 10 can remain compact.

The concave mirror 12 in this embodiment is a cylindrical concave mirror. The mirror is designed for reflecting and converging the incident light within the plane which is parallel to the short side of the screen and vertical to the screen of the display device 20 (within the plane parallel to the sheet of FIG. 12). More particularly, the concave mirror 12 in this embodiment has an optical power on the parallel plane but not on the plane vertical to the parallel plane (as vertical to the sheet of FIG. 12). The first polarizer 13 is bonded to the front side of the concave mirror 12 and coated at the surface with an antireflection coating similar to that in Embodiment 1.

On the parallel plane to the sheet of FIG. 12, the incident light on the display device 20 needs to be converged. Otherwise, the display device 20 will be illuminated only at a poor level of the efficiency. Moreover, other components of the incident light which fail to fall on the display screen of the display device 20 may become stray light in the illumination optical system 10, hence producing ghost effects and declining the quality of the image to be viewed. Since the concave mirror 12 is implemented by a cylindrical concave mirror which can converge the incident light on the parallel plane, it is possible to avoid reduction in the illumination efficiency and deterioration in the quality of the image to be viewed at the same time. Meanwhile, portions of the light that become stray light along the long side of the screen of the display device 20 are not received by the pupil EP of the viewer and will never produce unwanted ghost effects to decline the quality of the image as is negligible.

Also, the concave mirror 12 of a cylindrical type allows the first polarizer 13 to be neatly bonded in a curved form to the curved surface thereof. This will eliminate an extra holding member for supporting the first polarizer 13, thus contributing to the further compactness of the illumination optical system 10.

Embodiment 3

A further embodiment of the present invention will be described referring to the relevant drawings. For ease of the description, like elements are denoted by like numerals as those of Embodiment 1 or 2 and will be explained in no more detail.

Figure 13:
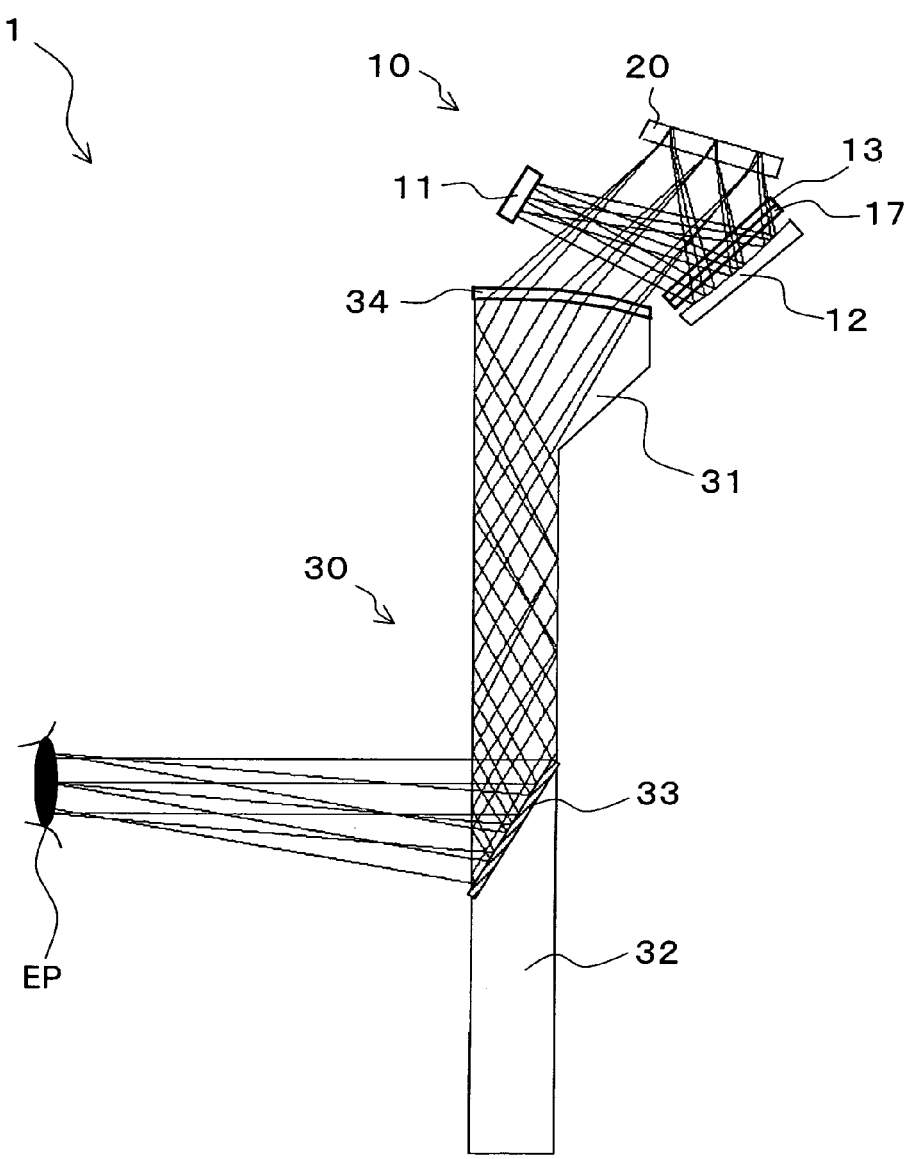
FIG. 13 is a cross sectional view schematically showing an arrangement of an image display apparatus according to a further embodiment of the present invention.

FIG. 13 is a cross sectional view schematically showing an arrangement of an image display apparatus 1 of this embodiment. In this embodiment, the illumination optical system 10 in Embodiment 1 further includes a diffuser plate 17.

The diffuser plate 17 is provided for diffusing the incident light received along the optical path bent by the concave mirror 12. When the B, G, and R emitters of the light source 11 are aligned along the long side of the display device 20, the diffuser plate 17 may be arranged in a one-way diffusion mode to diffuse the incident light along the direction of the long side. Alternatively, the diffuser plate 17 may has a surface thereof undulated or be implemented by a hologram optical element of volume phase type of which the surface is planer such as employed in Embodiment 4 described later.

The diffuser plate 17 is arranged to extend throughout an area for illuminating the screen of the display device 20 with a reflection of the light from the concave mirror 12 and particularly located close to the front side of the concave mirror 12. The diffuser plate 17 and the first polarizer 13 are aligned in this order from the mirror 12 side across the optical path which extends between the concave mirror 12 and the display device 20.

With the diffuser plate 17 positioned as described, the advantageous effect can be provided equal to when the light source is increased in the light emitting area, hence ensuring uniform illumination of the light without color shading and increasing the size of the pupil EP for monitoring. The size of the pupil EP may be increased with the diffuser plate 17 located just in front of the light source 11. In the latter case, the incident light will unfavorably be increased in the flux diameter and thus declined in the efficiency of use with creating a significant amount of loss.

Moreover, since the diffuser plate 17 and the first polarizer 13 are aligned in this order from the concave mirror 12, any unfavorably polarized component of the reflection of the light from the concave mirror 12 which have been developed after the diffusing action of the diffuser plate 17 can successfully be blocked by the first polarizer 13. As the result, the incident light to be received by the display device 20 will be improved in the degree of polarization.

Figure 14:
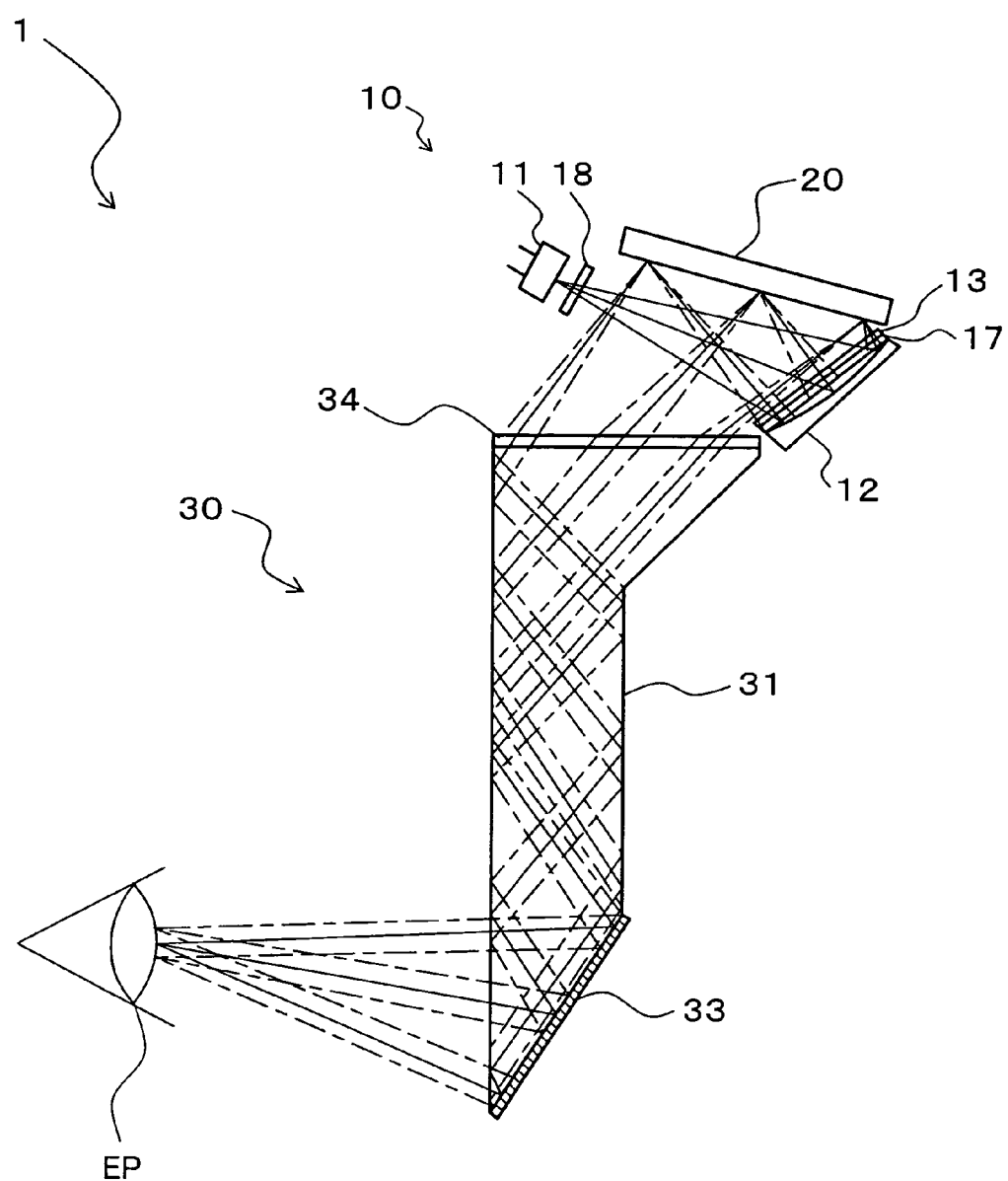
FIG. 14 is a cross sectional view showing a modification of the image display apparatus of the further embodiment.

FIG. 14 is a cross sectional view showing a modification of the image display apparatus 1. As shown, the illumination optical system 10 in the modification of the image display apparatus 1 includes further a third polarizer 18.

The third polarizer 18 is provided for transmitting and directing particular a desired polarized component (P polarized component in this embodiment) of the light emitted from the light source 11 which is identical to that passed across the first polarizer 13 towards the concave mirror 12. The third polarizer 18 is located at the side where the light source 11 is present about the optical path which extends from the display device 20 to the eyepiece optical system 30 (between the light source 11 and the optical path).

By positioning the third polarizer 18 as described above, a polarized component (S polarized component in this embodiment) of the light emitted from the light source 11 which can pass across the second polarizer 34 in the eyepiece optical system 30 may be blocked by the third polarizer 18. More specifically, the third polarizer 18 prevents the unwanted S polarized component of the light emitted from the light source 11 from reaching the eyepiece optical system 30 either directly or by reflected on the surface of the first polarizer 13. Accordingly, it is possible to avoid the effect of ghost (flare), and the image to be viewed can be prevented from being declined in the quality.

In particular, by positioning the third polarizer 18 adjacent to the light source 11, i.e. positioning the third polarizer 18 closer to the light source 11 than the optical path which extends from the display device 20 to the eyepiece optical system 30, it can block at higher efficiency the unwanted S polarized component of the light emitted from the light source 11, thus preventing the image from being declined in the quality by the effect of ghost.

Also, the third polarizer 18 allows the P polarized light to pass, thus minimizing the surface reflection on the first polarizer 13 as compared with the passing of the S polarized component of the light, hence preventing the image from being declined in the quality by the loss of light energy.

Embodiment 4

A still further embodiment of the present invention will be described referring to the relevant drawings. For ease of the description, like elements are denote by like numerals as those of any of Embodiments 1 to 3 and will be explained in no more detail.

Figure 15:
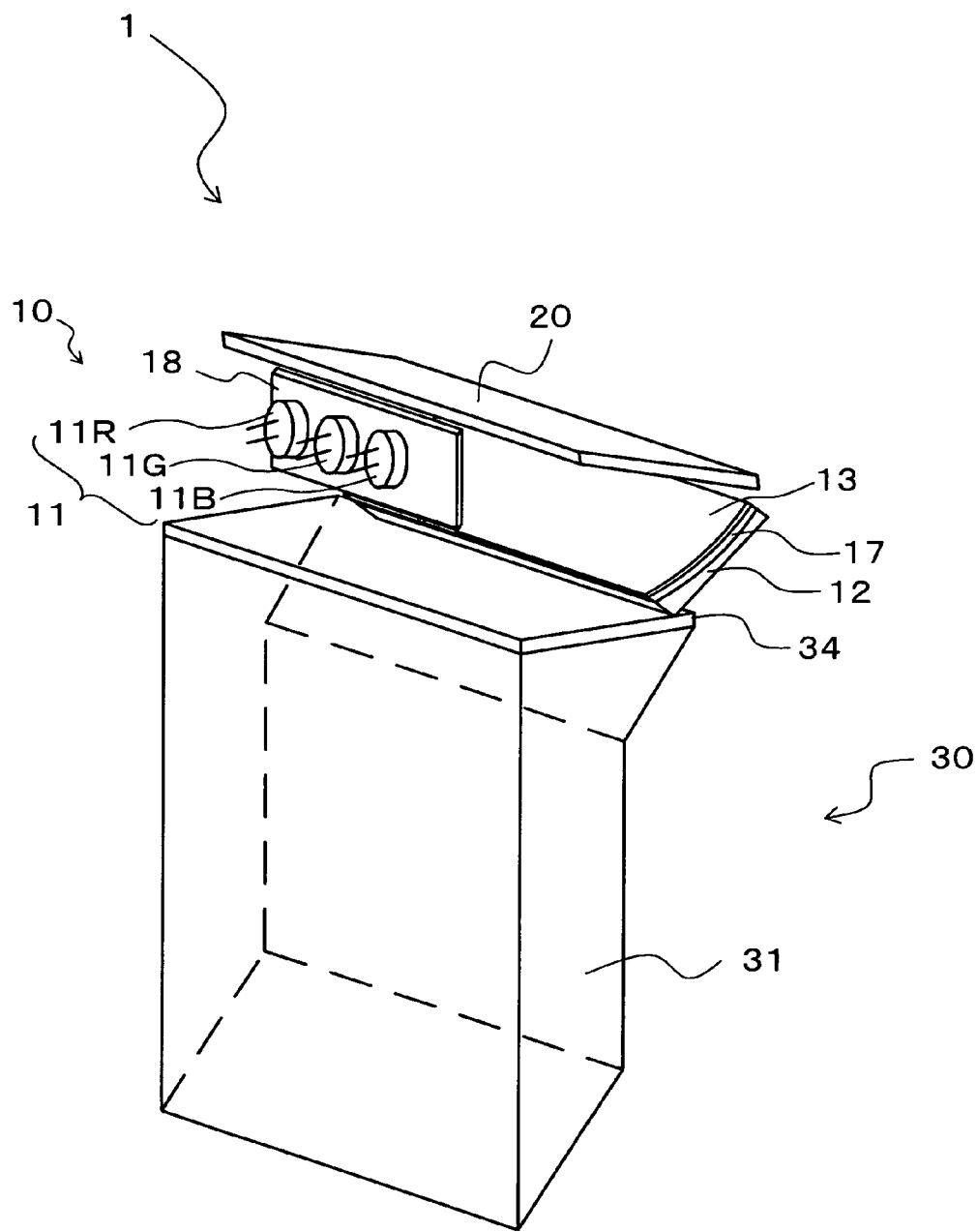
FIG. 15 is a cross sectional view schematically showing an arrangement of an image display apparatus according to a still further embodiment of the present invention.

FIG. 15 is a perspective view schematically showing an arrangement of an image display apparatus 1 of this embodiment. In this embodiment, the light source 11 and the diffuser plate 17 are implemented by a set of point light sources and a hologram optical element of volume phase type respectively in the arrangement of Embodiment 3. The description starts with the light source 11.

The light source 11 includes a set of point light sources 11B, 11G, and 11R for emitting different wavelengths of light (the three, B, G, and R, primary colors of light in this embodiment). The point light sources 11B, 11G, and 11R are aligned along the long side of the screen of the display device 20.

For example, if the point light sources 11B, 11G, and 11R are aligned along a direction vertical to the long side of the screen of the display device 20, their position may be dislocated on the plane which is parallel to the short side of the screen and vertical to the screen of the display device 20 when the optical path in the illumination optical system 10 is bent on the plane by the action of the concave mirror 12. This will require the distance between the display device 20 and the eyepiece optical system 30 to increase for guiding the light of each wavelength throughout the short side of the screen of the display device 20, thus increasing the overall dimensions of the apparatus.

Since the point light sources 11B, 11G, and 11R are favorably aligned along the long side of the screen of the display device 20 in this embodiment, their position on the plane remains unchanged along the long side of the display device 20 but not dislocated along the short side. Accordingly, the arrangement in which the optical path in the illumination optical system 10 is bent does not require increase in the distance between the display device 20 and the eyepiece optical system 30, and the light of each wavelength can be guided throughout the short side of the display device 20. As the result, the apparatus employing a set of the point light sources 11B, 11G, and 11R can be minimized in the overall size.

The diffuser plate 17 in this embodiment will now be explained. The diffuser plate 17 has a higher degree of diffusion along the direction parallel to the long side of the display device 20. With this diffuser plate 17, three different (B, G, and R) colors of the light emitted from the point light sources 11B, 11G, and 11R are properly spread, overlapped, and then diffused along the row of the three point light source 11B, 11G, and 11R by the action of the diffuser plate 17. This allows the effect of illumination to be equal to that with a single light source of extensive size.

Since the three different (B, G, and R) colors of the light emitted from the point light sources 11B, 11G, and 11R are favorably diffused by the action of the diffuser 17, they fall uniformly throughout the screen of the display device 20. Accordingly, any unwanted color shading may be avoided.

It is known that a common type of the diffuser plate has a surface thereof roughened as undulated in minimal scales. Because the diffuser plate 17 in this embodiment is positioned with a very small distance from the display device 20, when a common type of diffuser plate is employed as the diffuser plate 17, the rough and undulated surface may develop unevenness of the illumination light thus declining the quality of the image to be viewed.

For compensation, the diffuser plate 17 in this embodiment is implemented by a hologram optical element of volume phase type, where the surface is planer, but not any common type having a surface thereof roughened. Because of its hologram optical element of volume phase type in this embodiment, the diffuser plate 17 can avoid the effect of illumination unevenness thus allowing no declination in the quality of the image to be viewed.

Figure 16:
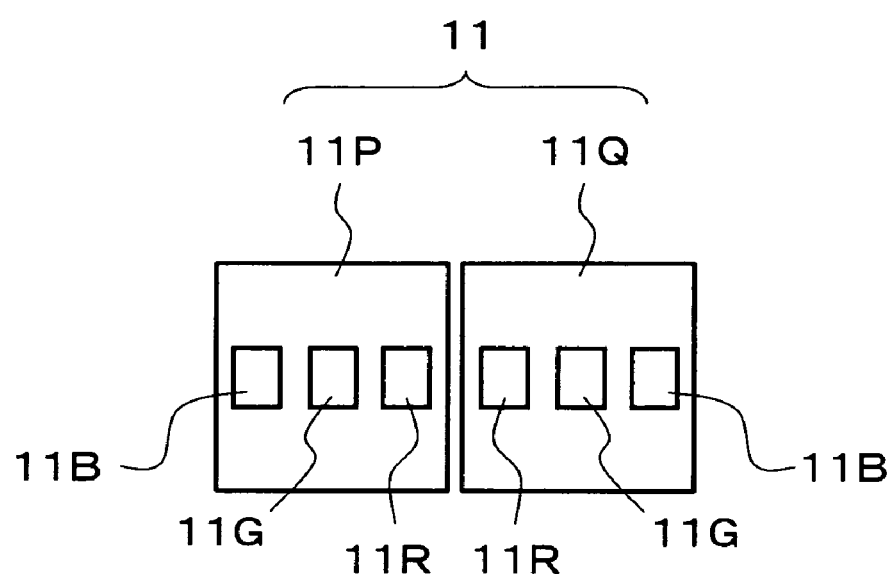
FIG. 16 is a plan view schematically showing an arrangement of a modification of the light source in the image display apparatus of the still further embodiment.

Alternatively, the light source 11 may be implemented by two sets of the three point light sources 11B, 11G, and 11R. FIG. 16 is a plan view schematically showing a modification of the light source 11. The modification of the light source 11 includes two sets 11P and 11Q of point light sources. The two sets 11P and 11Q may be separated from each other, as shown in FIG. 16, or assembled in a package.

When the two sets 11P and 11P are employed in the light source 11, they may preferably be opposite in the order of the three point light sources 11B, 11G, and 11R along the direction parallel to the long side of the display device 20. More particularly, the three point light sources 11B, 11G, and 11R of the set 11P are aligned in this order along the direction parallel to the long side of the display device 20 while the three point light sources of the set 11Q are 11R, 11G, and 11B in a row. As the two sets 11P and 11Q of the point light sources 11B, 11G, and 11R are arranged at symmetry about the boundary between the two sets 11P and 11Q, the gravity center of the intensity (the sum of the intensity levels of the two sets 11P and 11Q) of each color of the light emitted from the three point light sources 11B, 11G, and 11R agrees among the three primary colors, hence permitting no color shading to be developed along the (left to right) direction.

The number of the sets in the light source 11 is not limited to two but may be any even number. Even if the number of the sets is an even number, the gravity center of the intensity will agree among the three primary colors with any two adjacent sets of the three point light sources 11B, 11G, and 11R arranged opposite in the order. Equal to the above description, it is possible to suppress occurrence of the color shading along the (left to right) direction.

Embodiment 5

A still further embodiment of the present invention will be described referring to the relevant drawings. For ease of the description, like elements are denote by like numerals as those of any of Embodiments 1 to 4 and will be explained in no more detail.

Figure 17:
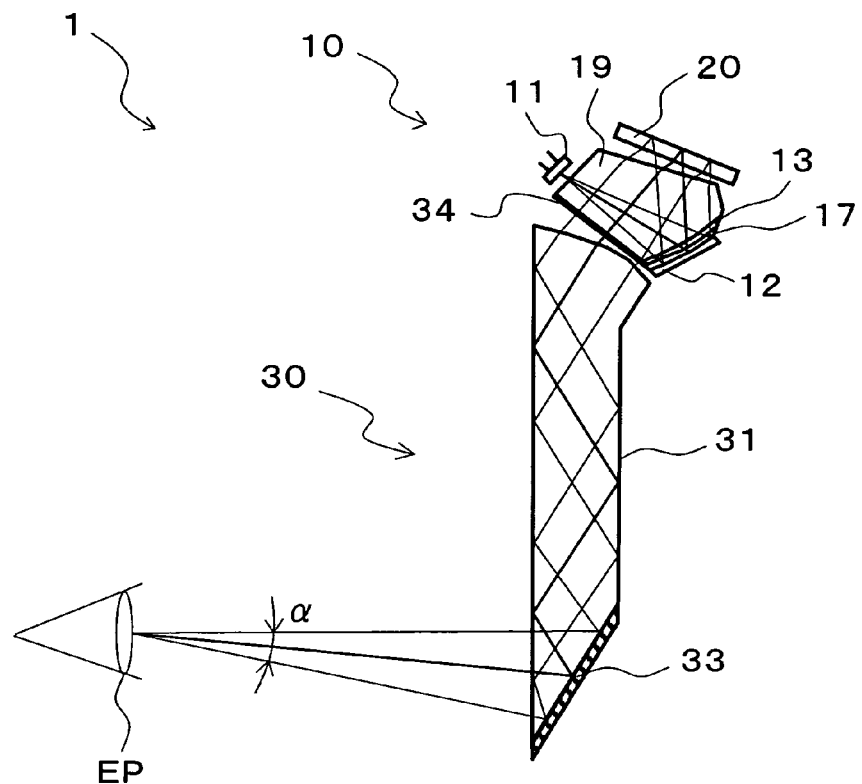
FIG. 17 is a cross sectional view schematically showing an arrangement of an image display apparatus according to a still further embodiment of the present invention.

FIG. 17 is a cross sectional view schematically showing an arrangement of an image display apparatus 1 of this embodiment. This embodiment is substantially equal in the arrangement to Embodiment 3, except that the illumination optical system 10 includes further an illumination prism 19 while the eyepiece prism 31 in the eyepiece optical system 30 is modified at its incident side (facing the display device 20) for eliminating any interference with the illumination prism 19. In FIG. 17, the third polarizer 18 is not illustrated.

The illumination prism 19 is located across both the optical path which extends from the light source 11 to the concave mirror 12 and the optical path which extends from the display device 20 to the eyepiece optical system 30. The illumination prism 19 is spaced by a layer of air from the display device 20 and by another layer of air from the eyepiece prism 31 in the eyepiece optical system 30. The illumination prism 19 in this embodiment is made of a plastic resin material of which the refraction index n is as uniform as substantially 1.5.

Figure 18:
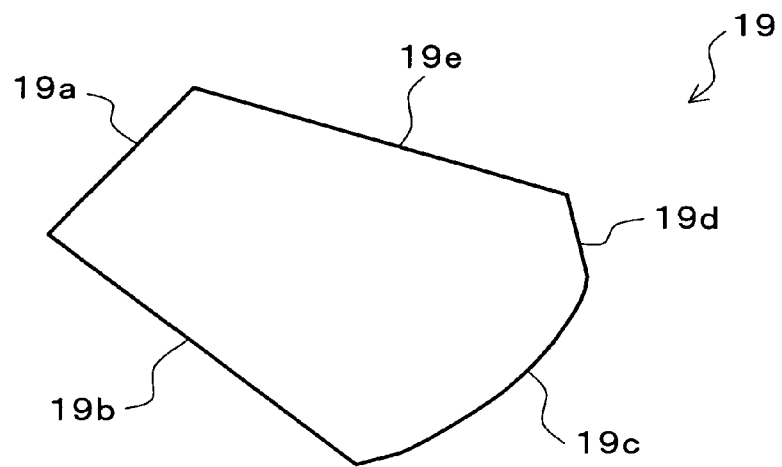
FIG. 18 is an enlarged cross sectional view showing an illumination prism in the image display apparatus of the still further embodiment.

FIG. 18 is an enlarged cross sectional view of the illumination prism 19. The illumination prism 19 has a number of sides 19a to 19e thereof. The side 19a faces the light source 11 as is planer in this embodiment and connected with the side 19b. The side 19b faces the eyepiece prism 31 in the eyepiece optical system 30 as is planer in this embodiment. Also, the side 19b is bonded integrally with the second polarizer 34 in the eyepiece optical system 30 thus forming a single unit with the illumination prism 19. The side 19b is connected to the side 19c.

The side 19c faces the concave mirror 12 across the first polarizer 13 and the diffuser plate 17 as is located at the side opposite to the light source 11 about the optical path which extends from the display device 20 to the eyepiece optical system 30. In this embodiment, the side 19c is arranged of an arcuate or concave cylindrical shape having an optical power on the plane which extends in parallel to the short side of the screen and vertical to the screen of the display device 20 (parallel to the sheet of FIG. 17) but not on the plane which extends in parallel to the long side of the screen and vertical to the screen of the display device 20 (vertical to the sheet of FIG. 17).

The side 19c is bonded integrally with the first polarizer 13, the diffuser plate 17, and the concave mirror 12 in this order, thus forming a single unit with the illumination prism 19. More particularly, the first polarizer 13 is bonded to the side 19c of the illumination prism 19 as hence sandwiched between the illumination prism 19 and the concave mirror 12. The diffuser plate 17 is bonded to the first polarizer 13 as supported by the illumination prism 19 across the first polarizer 13. The concave mirror 12 is bonded to the diffuser plate 17 as supported by the illumination prism 19 across the diffuser plate 17 and the first polarizer 13. Alternatively, the first polarizer 13, the diffuser plate 17, and the concave mirror 12 may be joined not with the illumination prism 19 but supported directly by a separate support member. The side 19c of the illumination prism 19 is connected to the side 19d.

The side 19d connects between the side 19c and the side 19e and may be planer or arcuate. Alternatively, the two sides 19c and 19e may be connected directly to each other while the side 19d is eliminated. The side 19e faces the display device 20 as is planer in this embodiment and connected to the side 19a. The side 19e extends not in parallel with the side 19b so that the normal of the side 19b intersects the normal of the side 19e at an angle.

With the illumination prism 19 arranged as described, the light emitted from the light source 11 enters the side 19a of the illumination prism 19 and runs from the side 19c facing the side 19a to the first polarizer 13. The P polarized component of the light is passed across the first polarizer 13, diffused by the action of the diffuser plate 17, and turned towards the display device 20 by the action of the concave mirror 12. The light turned by the action of the concave mirror 12 is passed again across the diffuser plate 17 and the first polarizer 13 and received by the display device 20 where it is modulated and released as an image light.

The image light then enters the side 19e of the illumination prism 19 and runs from the side 19b facing the side 19e across the second polarizer 34 to the eyepiece prism 31. More particularly, the light released from the display device 20 is passed across the side 19e and the side 19b of the illumination prism 19 and received by the eyepiece optical system 30. The incident light on the eyepiece prism 31 is then directed to the pupil EP by the action of the hologram optical element 33 as is similar to the action of Embodiment 1.

As described, the illumination prism 19 in this embodiment is located across both the optical path which extends from the light source 11 to the concave mirror 12 and the optical path which extends from the display device 20 to the eyepiece optical system 30 while the optical path is bent by the action of the concave mirror 12 provided outwardly of the illumination prism 19. This allows the (first) ray of light traveling from the light source 11 to the concave mirror 12 and the (second) ray of light traveling further on the same optical path as the just-mentioned (first) ray of light from the display device 20 to the eyepiece optical system 30 to cross each other in a medium (at the interior of the illumination prism 19) which is substantially uniform in the refraction index outwardly of the eyepiece optical system 30. Accordingly, while the illumination optical system 10 remains not increased in the optical power, its optical path which extends from the light source 11 located adjacent to the optical path extending from the display device 20 to the eyepiece optical system 30 can be set to a length in the illumination optical system 10 required for illuminating the display device 20. As the result, the apparatus like that of Embodiment 1 can easily be minimized in the thickness or the overall size.

In addition, as the first ray of light and the second ray of light cross each other in the interior of the illumination prism 19 of which the medium is substantially uniform in the refraction index, they can remain unchanged in the refraction index at the intersection. Accordingly, no unwanted light will be developed at the intersection and the image to be viewed can be protected from any declination of its quality.

The intersection between the first ray of light and the second ray of light is within the illumination prism 19 and outside the eyepiece optical system 30. This allows the second polarizer 34 in this embodiment to be located between the intersection of the two rays of light (in the illumination prism 19) and the eyepiece prism 31. The second polarizer 34 favorably blocks any unwanted (ghost) component of the light which runs from the light source 11 across the illumination prism 19 to the eyepiece prism 31, and only the incident light (image light) received from the display device 20 may be directed toward the eyepiece prism 31 via the second polarizer 34. Thus, the image light to be viewed across the eyepiece prism 31 by a viewer can be protected from being disturbed by any unwanted ghost light.

In this embodiment, the second polarizer 34 is bonded to the illumination prism 19. This allows the second polarizer 34 to be securely supported together with the illumination prism 19 which remains held in the illumination optical system 10 by the housing 3 (FIG. 2). Accordingly, no extra member (mechanism) will be needed for supporting the second polarizer 34. As the illumination prism 19 is bonded at its planer side with the second polarizer 34, its jointing to the second polarizer 34 can be simplified and tightened.

Since the illumination prism 19 is located outwardly of the eyepiece optical system 30, the actual distance between the display device 20 and the eyepiece prism 31 in the eyepiece optical system 30 can certainly be adjusted. As the result, the illumination optical system 10 will significantly be increased in the freedom of design.

For example, when the image display apparatus 1 is increased in the display angle α (angle of view), the focal distance of the eyepiece optical system 30 has to be shortened. As the result, the distance between the display device 20 and the eyepiece prism 31 in the eyepiece optical system 30 will be too short when the intersection between the two lights is in the air, thus limiting the arrangement of the optical elements in the illumination optical system 10.

For compensation, the eyepiece prism 31 may be reduced in the height. More specifically, the arrangement of the optical elements in the illumination optical system 10 may be eased when the eyepiece prism 31 is lowered with its upper end close to the hologram optical element 33 thus to widen the layer of air between the display device 20 and the eyepiece prism 31 and spare the space. However, because the image display apparatus 1 of this embodiment employs preferably a see-through type HMD shown in FIG. 2, the above compensation may be unfavorable with the eyepiece prism 31 reduced in the height and thus the see-through area narrowed.

In this embodiment, the function of the illumination prism 19 which has a refraction index of n and is located properly permits the actual distance between the display device 20 and the eyepiece prism 31 to be generously increased in comparison with the case not including the illumination prism 19. Accordingly, even if the eyepiece optical system 30 is modified to shorten the focal length for increasing the display angle α, the optical elements other than the illumination prism 19 in the illumination optical system 10 can be laid out with much ease.

It has been known from experiments that the above mentioned advantage is ensured when the refraction index n of the medium of the illumination prism 19 is $1.4<n<2.0$. Hence, the illumination prism 19 can be made of a glass material having the refraction index n of substantially 1.8 or any other resin material of which the refraction index n falls in the above range.

Also, the illumination prism 19 in this embodiment has the two sides 19e and 19b arranged not parallel to each other but aligned this order across which the light runs from the display device 20 to the eyepiece optical system 30. Accordingly, the tilting of the image surface and the color aberration can significantly be corrected by modifying the tilting of the illumination prism 19 or the position and angle (between the normal lines) of the two sides 19e and 19b. As the result, the apparatus can be increased in the freedom of design while providing a higher quality of the image to be viewed.

In this embodiment, the first polarizer 13, the diffuser plate 17, and the concave mirror 12 are supported integral with the illuminated prism 19. This simplifies the construction of the housing 3 in which the optical elements of the illumination optical system 10 are secure installed, thus contributing to the downsizing and the cost down of the illumination unit.

Alternatively, the first polarizer 13, the diffuser plate 17, and the concave mirror 12 may not entirely but partially be supported integral with the illuminated prism 19, as opposed to entirely supported integral with the illuminated prism 19. For example, while the first polarizer 13 is bonded to the side 19c of the illumination prism 19 and supported together in the housing 3, the diffuser plate 17 and the concave mirror 12 are separately supported in the housing 3. In another instance, while the concave mirror 12 is separately supported in the housing 3, the first polarizer 13 is bonded to the side 19c of the illumination prism 19 and the diffuser plate 17 is bonded to the first polarizer 13 and supported all together in the housing 3.

In either case, the construction of the housing 3 can be simplified as compared with the optical elements separately supported in the housing 3. Above all, the arrangement of this embodiment may be best for simplifying the construction of the housing 3 as characterized in that the first polarizer 13, the diffuser plate 17, and the concave mirror 12 are supported integral with the illuminated prism 19.

Furthermore, the illumination prism 19 may be applicable to the arrangement shown in FIG. 3 or 4. While the illumination prism 19 is located between the first polarizer 13 and the concave mirror 12, it may be bonded either at one side with only the concave mirror 12 or at different sides both the first polarizer 13 and the concave mirror 12, thus forming a single unit. In either case, the construction of the housing 3 becomes simple thus contributing to the downsizing and the cost down of the illumination unit.

The illumination prism 19 in this embodiment is of a concave cylindrical type having the arcuate side 19c to which the first polarizer 13 is bonded and its joining with the first polarizer 13 can thus be simplified and secured. Alternatively, the size 19c of the illumination prism 19 may be planer which is also favorable for joining between the illumination prism 19 and the first polarizer 13. In case that the illumination prism 19 remains not bonded to the first polarizer 13 (which is supported separately), its side 19c may be spherical.

Figure 19:
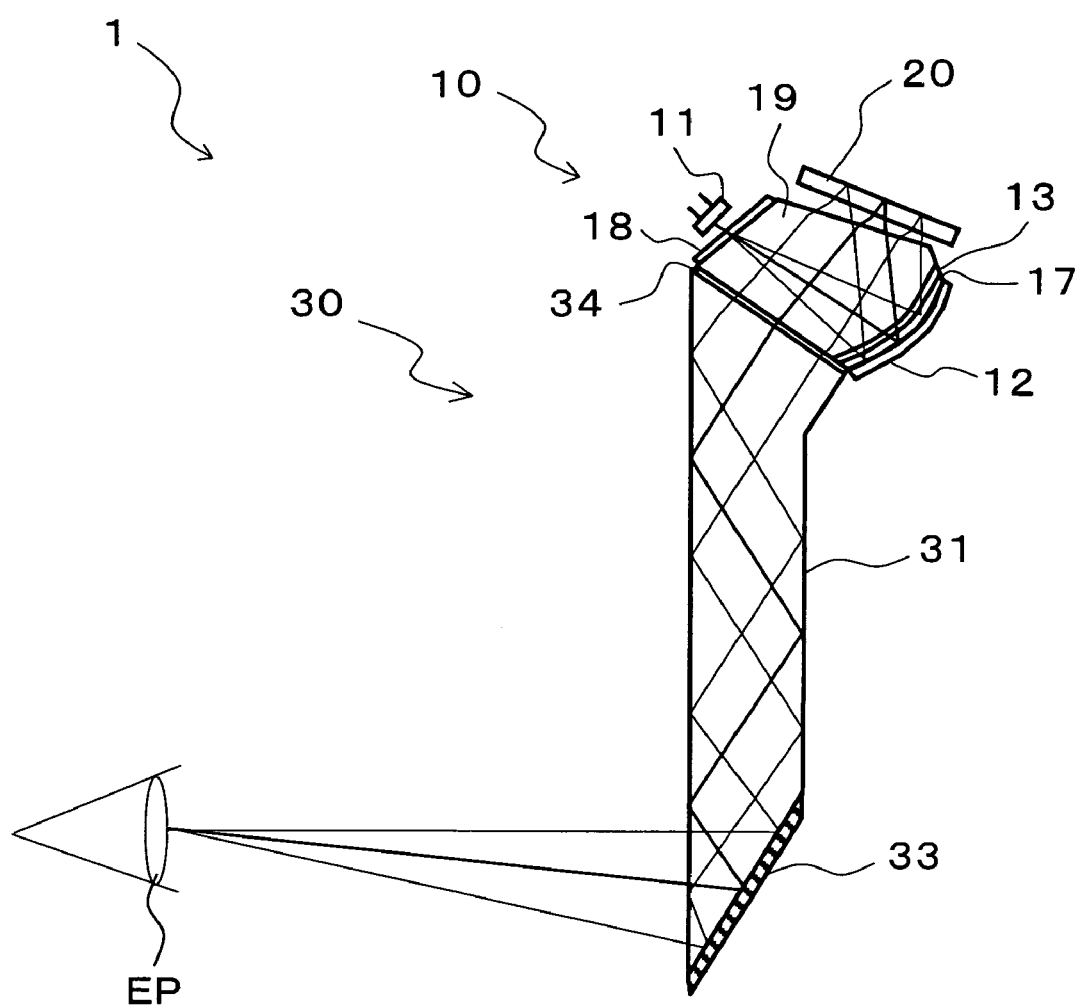
FIG. 19 is a cross sectional view showing a modification of the image display apparatus of the still further embodiment.

FIG. 19 is a cross sectional view showing another modification of the image display apparatus 1. The modification of the image display apparatus 1 is substantially identical in the arrangement to that shown in FIG. 17, except that the eyepiece prism 31 is joined by the second polarizer 34 to the illumination prism 19 thus forming a single unit. In the arrangement shown in FIG. 19, no extra member (mechanism) will be needed for separately supporting the eyepiece prism 31. Accordingly, the relative positional relationship between the illumination prism 19 and the eyepiece prism 31 can thus be determined upon their joining, hence improving the positional accuracy.

In the arrangement shown in FIG. 19, the third polarizer 18 is bonded to the side 19a of the illumination prism 19 and supported integral with the illumination prism 19. This also simplifies the construction of the housing 3 with the illumination optical system 10 accommodated regardless of the third polarizer 18 provided in the illumination optical system 10.

Figure 20:
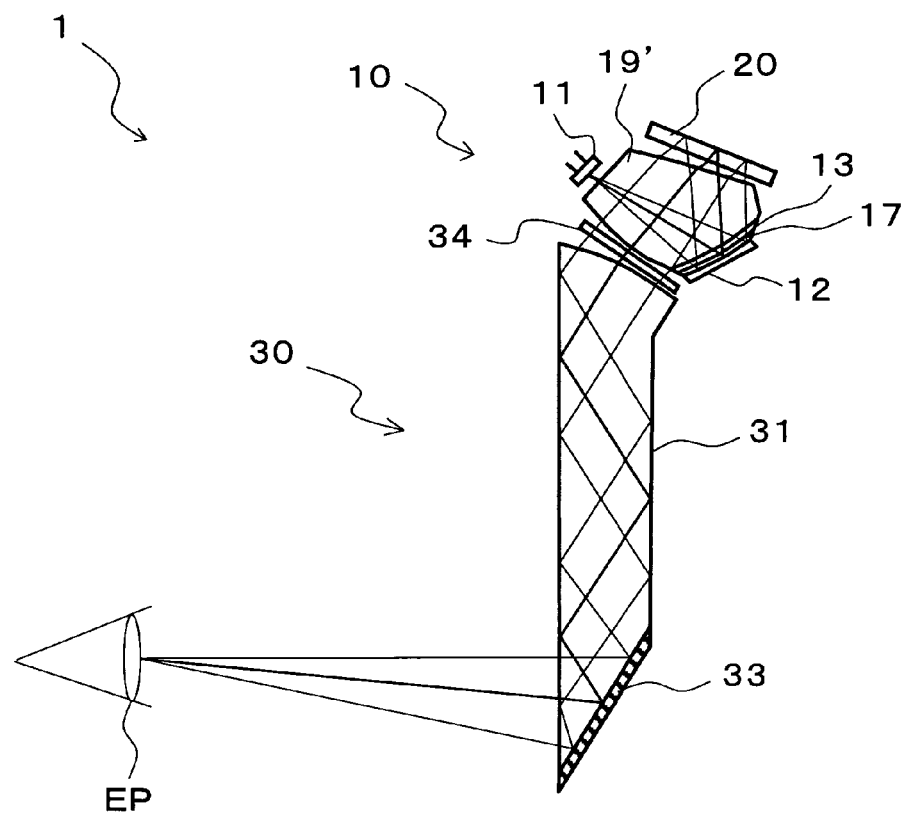
FIG. 20 is a cross sectional view showing another modification of the image display device of the still further embodiment.
Figure 21:
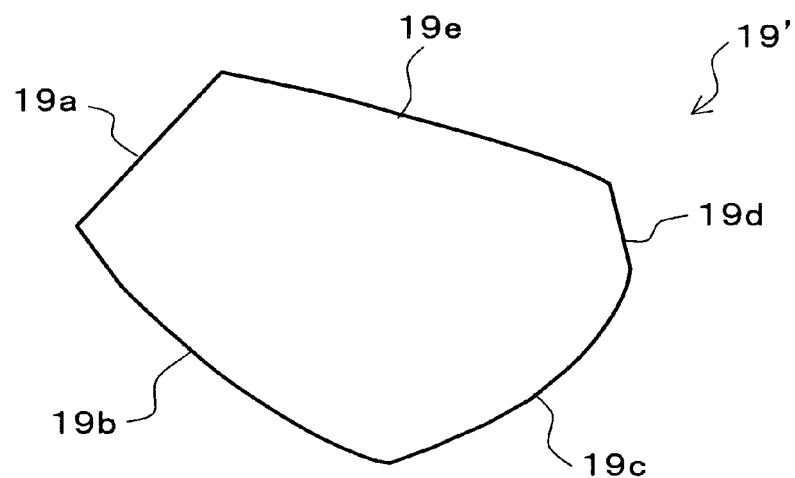
FIG. 21 is an enlarged cross sectional view showing an illumination prism in the another modification of the image display apparatus.

FIG. 20 is a cross sectional view showing a further modification of the image display apparatus 1. FIG. 21 is a cross sectional view schematically showing an illumination prism 19' in the modification of the image display apparatus 1. The illumination prism 19' shown in FIG. 21 is substantially equal in the arrangement to that of the illumination prism 19 shown in FIG. 18, except that each of the two sides 19e and 19b arranged in this order across which the light runs from the display device 20 to the eyepiece optical system 30 has an arcuate side thereof arranged having an optical power. Although the second polarizer 34 in the eyepiece optical system 30 of the arrangement shown in FIG. 20 is not bonded to the side 19b of the illumination prism 19' but supported by a separate member, it may be bonded to the side 19b.

Accordingly, the illumination prism 19' can share in the optical power with the eyepiece optical system 30. This will increase the freedom of design, thus allowing the image display apparatus 1 to provide a higher quality of the image to be viewed. This advantage may equally be obtained with at least one of the two sides 19e and 19b arranged in an arcuate form having an optical power.

The arcuate side may be arranged of either concave cylindrical or spherical form. When the arcuate side is arranged of a concave cylindrical form, it can easily be bonded with the second polarizer 34. For ease of the joining between the illumination prism 19 and the second polarizer 34, the arcuate side is preferably arranged of such a concave cylindrical form.

When the illumination prism 19' is provided with its arcuate sides arranged having an optical power, it is preferable to fabricate the illumination prism 19' by molding a resin material rather than a glass material.

Embodiment 6

A still further embodiment of the present invention will be described referring to the relevant drawings. For ease of the description, like elements are denoted by like numerals as those of any of Embodiments 1 to 5 and will be explained in no more detail.

Figure 22:
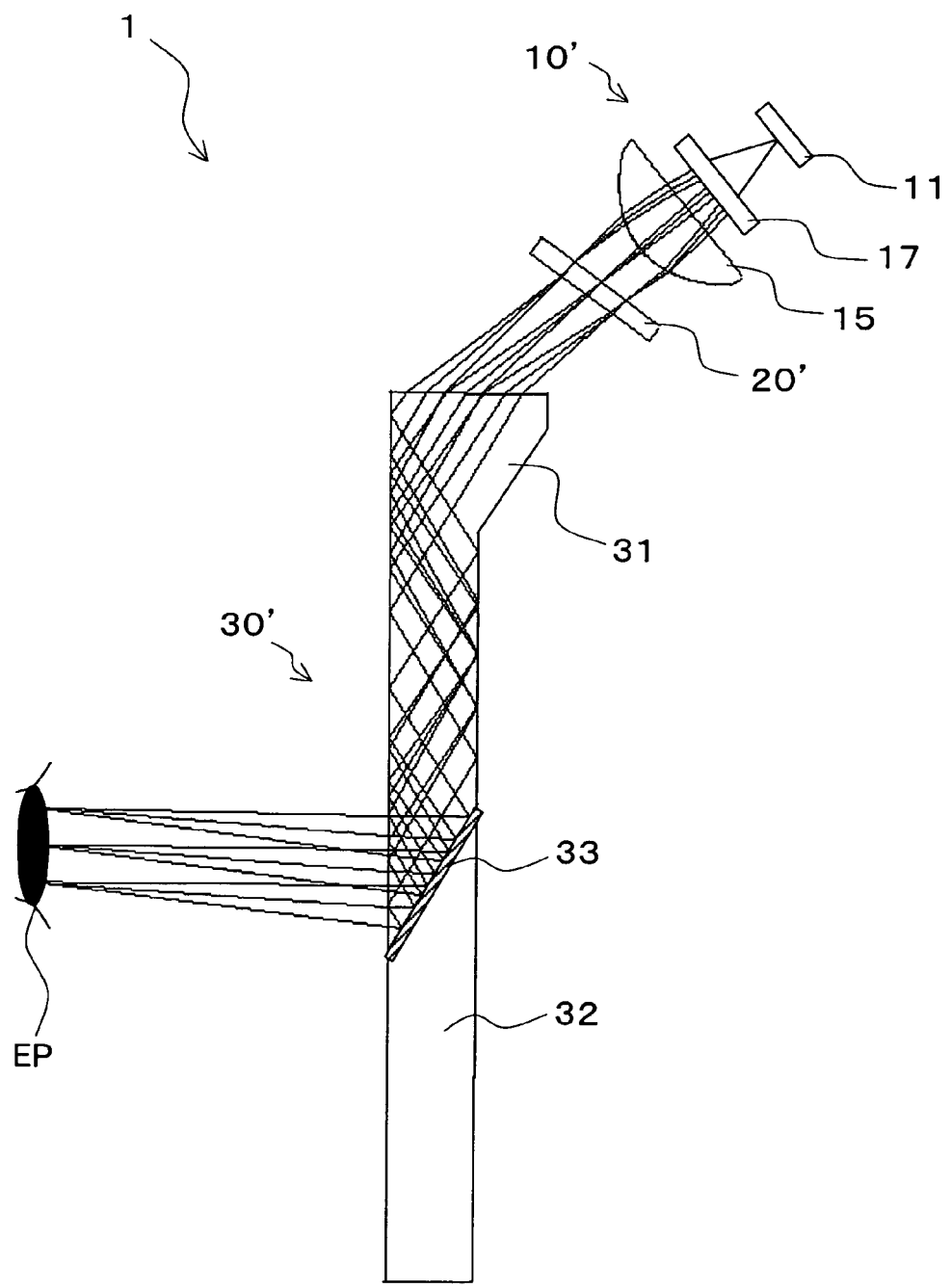
FIG. 22 is a cross sectional view schematically showing an image display apparatus according to a still further embodiment of the present invention.
Figure 23:
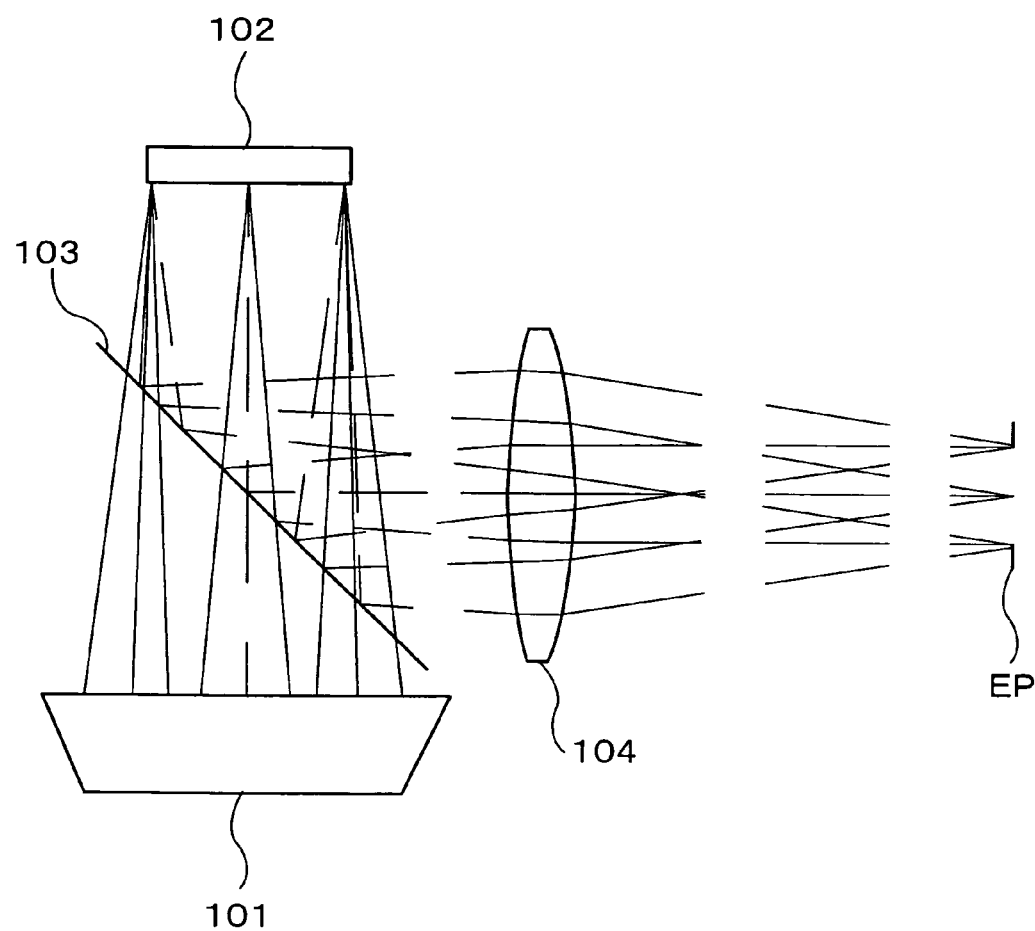
FIG. 23 is a cross sectional view schematically showing an arrangement of a conventional image display apparatus.
Figure 24:
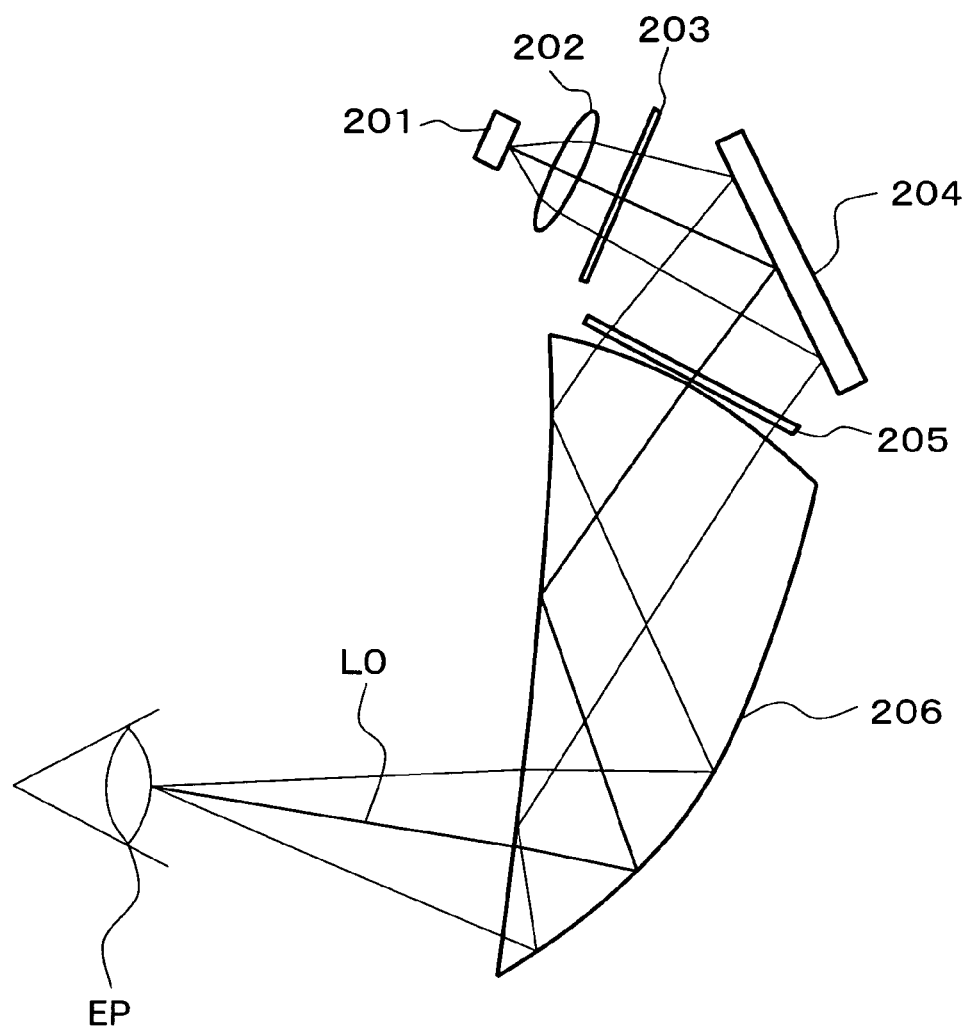
FIG. 24 is a cross sectional view schematically showing an arrangement of another conventional image display apparatus.
Figure 25:
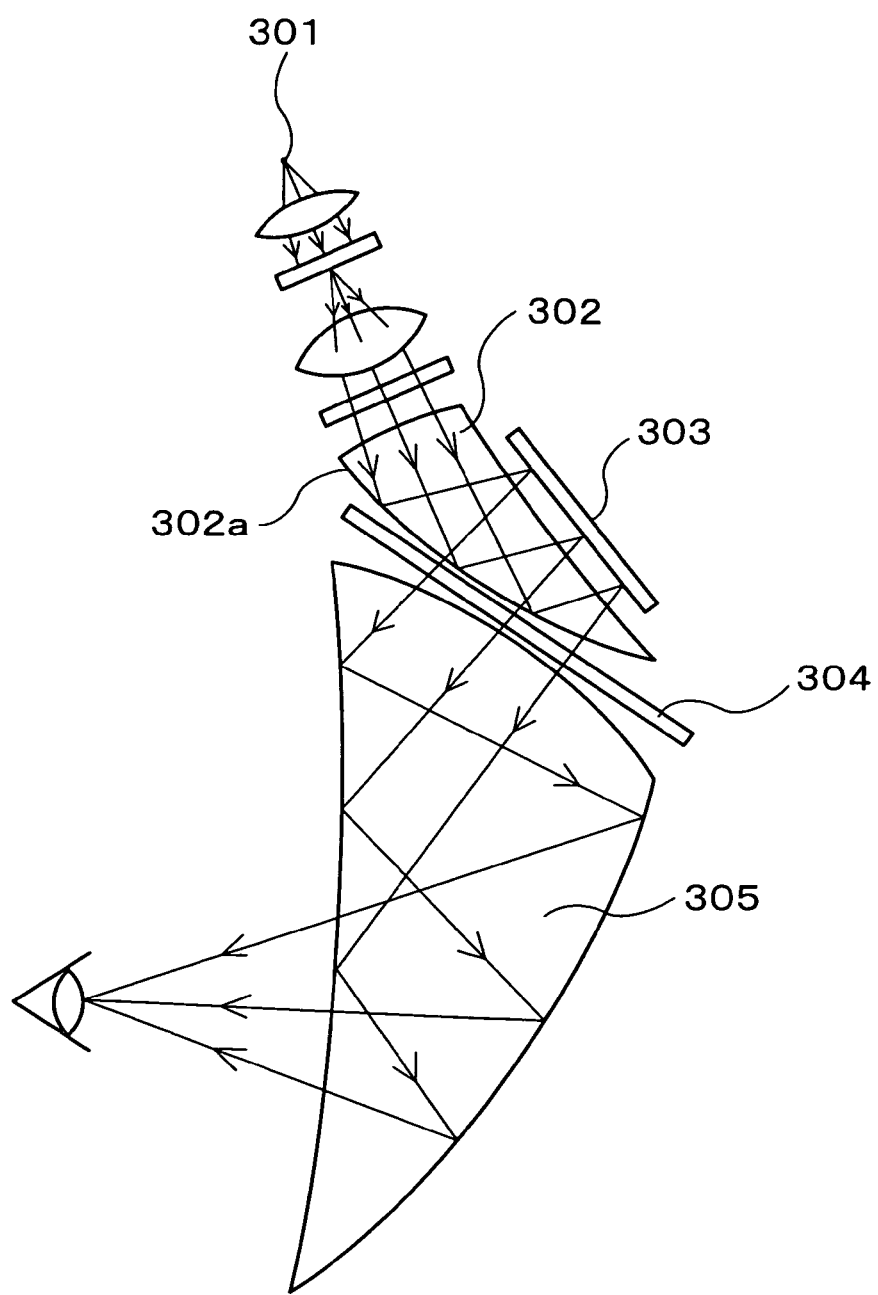
FIG. 25 is a cross sectional view schematically showing an arrangement of a further conventional image display apparatus.

FIG. 22 is a cross sectional view schematically showing an arrangement of an image display apparatus 1 of this embodiment. The image display apparatus 1 is arranged applicable to an HMD shown in FIG. 2 and includes an illumination optical system 10', a display device 20', and an eyepiece optical system 30'.

The illumination optical system 10' is provided for illuminating the display device 20', which is of a transparent type as will be described later, from the rear side (opposite to the screen side) and includes a light source 11, a diffuser plate 17, and a collector lens 15. The collector lens 15 is provided for converging on the display device 20' a light emitted from the light source 11 and diffused by the diffuser plate 17.

The display device 20' similar to the display device 20 in Embodiment 1 is an optical modulator having a matrix of pixels for displaying an image through modulating the light at each pixel emitted from the light source 11 in response to a corresponding image data. The display device 20' in this embodiment is a transparent, ferroelectric LCD device. The display device 20' has a ferroelectric LCD panel sandwiched between two substrates. Patterns of transparent (pixel) electrode are mounted on one of the two substrates while patterns of opposite electrode are provided on the other substrate. The display device 20' is driven at each pixel in a time-division mode in synchronism with the R, G, and B colors of light emitted in a sequence of time-division mode from the light source 11.

The eyepiece optical system 30' is also equal in the arrangement to the eyepiece optical system 30 in Embodiment 1, except that the hologram optical element 33 is fabricated using a three-layer color photo-polymer and the second polarizer 34 is eliminated. The hologram optical element 33 in this embodiment is characterized by the broken line Q shown in FIG. 11 where the fundamental function such as diffracting the B, G, and R colors of the light received from the display device 20' is identical to that of the hologram optical element fabricated using a single-layer color photo-polymer.

In action, the B, G, and R colors of light are emitted in a time-division mode from the light source 11 in the illumination optical system 10'. Each color of the light is diffused by the diffuser plate 17 and received across the collector lens 15 by the display device 20'.

In the display device 20', the incident light is modulated at each color in response to its corresponding image data and displayed as an image in a time-division mode. The output of light (the R, G, and B colors of light) is received by the eyepiece prism 31 in the eyepiece optical system 30' where it is fully reflected several times. Then, the light is diffracted by the action of the hologram optical element 33 and received by the optical pupil EP. As the display device 20' has been driven in the time-division mode, the image displayed in the display device 20' in the R, G, and B colors is viewed as an enlarged color virtual image by the viewer of which the pupil overlaps the optical pupil EP.

Simultaneously, as the ambient light is almost entirely passed across the eyepiece prism 31, the deflector prism 32, and the hologram optical element 33, its external scene can be viewed in a see-through mode by the viewer. As the result, the color virtual image received from the display device 20' can be viewed as partially overlapped with the external scene.

Since the display device 20' in this embodiment is of a transparent type, it allows the light source 11 to be laid out at the side opposite to the eyepiece optical system 30'. This disallows the eyepiece optical system 30' to receive any unwanted portion of the light which is not passed across the display device 20' from the light source 11. Accordingly, the eyepiece optical system 30' needs not to include an optical member at the incident side for blocking the unwanted light (such as the second polarizer 34 in Embodiment 1). As the result, the arrangement of the eyepiece optical system 30' can be simplified.

It should be understood that the image display apparatus or the HMD is implemented by any combination of the optical elements described with the preceding embodiments.

Although the image display apparatus is arranged applicable to an HMD in each of the embodiments, it may be applied to an electronic finder in a digital camera or a monitor in a mobile telephone with equal success.

As described, the image display apparatus according to the present invention allows the light source to be located adjacent to the optical path which extends from the reflective type display device to the eyepiece optical system without increasing the optical power of the illumination optical system. Also, the light source, the optical-path bending member, and the reflective display device are arranged in a compact space close to the eyepiece optical system. As the result, the apparatus can easily be minimized in the thickness or the overall size.

The medium provided outwardly of the eyepiece optical system which has substantially a uniform level of refraction index may be air. In that case, the image display apparatus can be simplified in the arrangement including the illumination optical system and reduced in the overall weight.

The medium which has substantially a uniform level of refraction index may be implemented by an illumination prism of which the refraction index n is expressed by $1.4<n<2.0$. Since the illumination prism allows two different lights (one running from the light source to the optical-path bending member and the other running from the reflective display device to the eyepiece optical system) to intersect each other in its medium of which the refraction index n stays within the above range, the actual distance between the reflective display device and the eyepiece optical system can be modified to a desired length. Accordingly, the optical systems can be improved in the freedom of design.

Also, the two sides of the illumination prism are arranged across which the light runs from the reflective display device to the eyepiece optical system and may be not in parallel to each other. When the positions of these two sides and the angle of intersect between (the normal lines of) the two sides is changed, any unwanted artifact such as tilting of the image plane or color aberration can favorably be corrected. Accordingly, the apparatus can produce a higher quality of the image while being increased in the freedom of design.

Alternatively, the two sides of the illumination prism are arranged across which the light runs from the reflective display device to the eyepiece optical system and at least one of them may be arranged of an arcuate form which has an optical power. This allows the illumination prism to share in the optical power with the eyepiece optical system. Accordingly, the apparatus can produce a higher quality of the image while being increased in the freedom of design.

The optical-path bending member is located preferably at the side opposite to the light source about the optical path which extends from the reflective display device to the eyepiece optical system. This allows the light running from the light source to the optical-path bending member to securely intersect the light running from the reflective display device to the eyepiece optical system in the medium outwardly of the eyepiece optical system. Accordingly, the apparatus can easily be decreased in the thickness or the overall size as one of the advantageous features of the present invention.

The optical-path bending member is arranged preferably for bending the optical path which extends from the light source to the reflective display device (in the illumination optical system) on the plate arranged in parallel to the short side of the screen and vertical to the screen of the reflective display device. This allows the optical path in the illumination optical system to be separated by a shorter distance from the optical path which extends from the reflective display device to the eyepiece optical system than that in the arrangement where the optical path in the illumination optical system is bent on the plane arranged in parallel to the long side of the screen and vertical to the screen of the reflective display device. Accordingly, the illumination optical system can be arranged in compactness.

The optical-path bending member is preferably a reflective mirror. This allows the optical-path bending member to be reduced in the weight and fabricated at less cost. In particular, the reflective mirror is preferably a concave mirror for reflecting and converging the incident light. This allows no collector lens to be provided across the optical path for converting the light emitted from the light source on the screen of the reflective display device. Accordingly, the illumination optical system can be simplified in the construction. The concave mirror may be of either spherical or cylindrical shape.

Alternatively, the reflective mirror may be a planer mirror. It is however desired to locate a collector lens across the optical path for converging the light emitted from the light source on the screen of the reflective display device.

The concave mirror may be preferably a cylindrical concave mirror for reflecting and converging the incident light only on the plane parallel to the short side of the screen and vertical to the screen of the reflective display device. Since the incoming (illumination) light is reflected and converged on the particular plane by the action of the cylindrical concave mirror, it can be improved in the illumination efficiency on the screen of the reflective display device with a minimum of loss. Unfortunately, other components of the light not entering the screen of the reflective display device stray in the illumination optical system and may develop an unwanted effect of ghost (flare). However, the described arrangement can favorably suppress such unwanted portions of the light, thus preventing the quality of the image from being declined.

Preferably, the illumination optical system includes the first polarizer for passing the desirably polarized component of the light (for example, P polarized light) received along the optical path bent by the optical-path bending member and directing the same to the reflective display device. Also, the eyepiece optical system includes preferably the eyepiece prism for reflecting the incoming light in its interior and the second polarizer for passing the other polarized component of the light (for example, S polarized light) orthogonal to the desirably polarized component and received from the reflective display device and directing the same to the eyepiece prism.

According to the arrangement, the desirably polarized component of the light (for example, P polarized light) emitted from the light source and directed along the optical path bent by the optical-path bending member is passed across the first polarizer and received by the reflective display device. In the reflective display device, the incoming light is modified and then released in the form of the other polarized component of the image light (for example, S polarized light) orthogonal to the desirably polarized component of the incoming light. The image light is then passed across the second polarizer, advanced through the eyepiece prism, and received by the pupil of the viewer. In brief, the arrangement allows the reflective display device to be positively illuminated regardless of the optical-path bending member and its modulated light (image light) to be securely passed across the eyepiece prism to the pupil of the viewer.

At the time, the first polarizer may be protected at the surface with an anti-reflection coating. This permits no unwanted component of the light emitted from the light source to be reflected on the surface of the first polarizer and received by the reflective display device before further directed from the reflective display device to the eyepiece optical system. Accordingly, the image to be viewed can be protected from being declined in the quality by the effect of such unwanted component of the light.

The illumination optical system includes preferably the third polarizer for passing the polarized component of the light emitted from the light source which is equal to the component passed across the first polarizer (for example, P polarized light) and directing the same to the optical-path bending member. Since the polarized component of the light passed across the first and third polarizers are orthogonal to the polarized component of the light passed across the second polarizer, only the desired one of the components of the light directed by the optical-path bending member and the reflective display device can be received by the eyepiece prism.

More particularly, the polarized component of the light emitted from the light source which has passed the second polarizer (for example, S polarized light) fails to pass the third polarizer and can thus be inhibited from passing directly from the light source to the eyepiece optical system or being reflected by the surface of the first polarizer and received by the eyepiece optical system. Accordingly, the development of any unwanted ghost (flare) will be avoided, thus permitting no declination in the quality of the image to be viewed. As the third polarizer is located at the light source side about the optical path which extends from the reflective display device to the eyepiece optical system, it can effectively block the unwanted component of the light at the location close to the light source and its function of blocking will be high in the efficiency.

The first and third polarizers are arranged to pass preferably the P polarized component of the light. As compared with the S polarized component of the light being passed, the effect of surface reflection (Fresnel loss) on the first polarizer or the reflective display device can be minimized thus inhibiting the quality of the image to be viewed from being declined by the loss.

The illumination optical system includes preferably the diffuser plate for diffusing the light of which the optical path is turned by the optical-path bending member. The diffuser plate provides the same effect as of a greater size of the light source, hence increasing the size of the pupil for viewing.

The diffuser plate and the first polarizer are located preferably in this order from the side of the optical-path bending member across the optical path between the optical-path bending member and the reflective display device. This allows any unwanted component of the light turned by the optical-path bending member and diffused by the diffuser to be successfully blocked by the first polarizer, thus increasing the purity of the polarized component of the light to be received by the reflective display device.

The diffuser plate is implemented by preferably the volume phase type hologram optical element. Since the volume phase type hologram optical element is planer at the surface and used as the diffuser plate, it can inhibit any illumination unevenness which may often be caused by a diffuser plate of which the surface is undulated.

The illumination optical system includes the first polarizer for passing a desired polarized component of the light of which the optical path is turned by the optical-path bending member and directing the same to the reflective display device. The first polarizer may be bonded to the illumination prism so as to be sandwiched between the illumination prism and the optical-path bending member.

Since the illumination optical system includes the first polarizer, a desired polarized light (for example, P polarized light) from the optical-path bending member is incident on the reflective display device to. This allows the reflective display device to release the image light of which the polarized component (for example, S polarized light) is orthogonal in the polarizing direction to the incident light. Simultaneously, as the first polarizer is bonded to the illumination prism so as to be sandwiched between and arranged integral with the illumination prism and the optical-path bending member, it can securely be supported by the housing which accommodates the illumination optical system while directly holds the illumination prism. As the result, the housing will be simplified in the construction.

When the illumination optical system includes the diffuser plate for diffusing the light of which the optical path is turned by the optical-path bending member, the diffuser plate may be supported via the first polarizer on the illumination prism.

Since the illumination optical system includes the diffuser plate, it can provide the same effect as of a greater size of the light source, hence increasing the size of the pupil for viewing. Simultaneously, the diffuser plate is supported across the first polarizer by the illumination prism and all the three components are arranged to a single unit. Accordingly, the first polarizer and the diffuser plate can securely be supported in the housing which accommodates the illumination optical system and directly holds the illumination prism. As the result, the housing can be simplified in the construction regardless of the diffuser plate provided in the illumination optical system.

The optical-path bending member is supported by the illumination prism preferably across the diffuser plate and the first polarizer. This allows the optical-path bending member to be joined integral with the illumination prism as well as the diffuser plate and the first polarizer, hence contributing to the simple construction of the housing in which those optical elements are accommodated.

The illumination prism has the side thereof, to which the first polarizer plate is bonded, arranged of preferably a planer or cylindrical form. This allows the illumination prism to be bonded with the first polarizer with much ease.

The eyepiece optical system includes the eyepiece prism for reflecting and advancing the incident light in its interior and the second polarizer for passing the desired polarized component of the incident light received from the reflective display device, which is orthogonal to the other polarized component of the light and directing the same to the eyepiece prism. The second polarizer may be located between the illumination prism and the eyepiece prism.

Since the second polarizer is located between the illumination prism and the eyepiece prism in the above arrangement, it can block any unwanted component (ghost) of the light directed from the light source across the illumination prism to the eyepiece prism while pass the incident light received from the reflective display device to the eyepiece prism. Accordingly, the image released from the eyepiece prism and received by a viewer can be inhibited from being declined in the quality by the effect of the ghost component of the light.

The second polarizer may be bonded to the illumination prism. As the illumination prism is directly held in the housing in which the illumination optical system, the second polarizer can be supported at the same time. As the result, no extra member (mechanism) will be needed for separately supporting the second polarizer.

The eyepiece prism may be supported via the second polarizer by the illumination prism. This allows no extra member (mechanism) to be needed for separately supporting the eyepiece prism. Also, the positional relationship between the illumination prism and the eyepiece prism can be determined upon their bonding, thus increasing the positional accuracy.

The illumination prism has the side thereof, to which the second polarizer is bonded, arranged of preferably a planer or cylindrical form. This allows the illumination prism to be bonded with the second polarizer with much ease.

When the reference axis is provided between the center of the screen of the reflective display device and the center of the pupil along the optical path which extends from the reflective display device across the eyepiece optical system to the pupil, the reflective display device is arranged preferably with its screen tilting to the reference axis between the reflective display device and the eyepiece optical system. This allows the optical path which extends from the light source across the optical-path bending member to the reflective display device to be securely separated from the optical path which extends from the reflective display device to the eyepiece optical system.

In particular, when the angle of incidence of the light turned by the optical-path bending member and received by the reflective display device is θ, established is preferably 10°<θ<60°. If the angle of incidence θ is lower than the lower limit, the distance between the reflective display device and the eyepiece optical system becomes greater. If the angle of incidence θ is higher than the upper limit, the distance between the light source and the optical-path bending member becomes greater. In either case, the downsizing of the apparatus will be interrupted. Accordingly, when the angle of incidence θ is within the above range, the downsizing of the apparatus can hardly be interrupted and the two optical paths can securely be separated from each other.

The light source consists of at least a set of the point light sources which emit different wavelengths of the light. The point light sources are aligned preferably in parallel to the long side of the reflective display device. This allows each of the point light sources not to be dislocated along the short side of the reflective display device on the plane which is parallel to the short side of the screen and vertical to the screen of the reflective display device and along which the optical path of the illumination optical system is bent. Accordingly, even if the distance between the reflective display device and the eyepiece optical system is not wide, each of the wavelengths of the light can be directed along the short side of the reflective display device. As the result, the downsizing of the apparatus can successfully be realized with the use of a plurality of the point light sources.

The number of the sets of the point light sources is preferably an even number where any two adjacent sets of the point light source along the direction parallel to the long side of the reflective display device are opposite to each other in the order of the point light sources. This allows the different colors of the light emitted from the point light sources agree in the gravity center of the intensity of the light, thus minimizing the color shading along the (left to right) direction.

The reflective display device is preferably of a reflective, ferroelectric LCD type. Since the reflective, ferroelectric LCD device is wider in the angle of view, its image can be high in the contrast and the color reproduction (wide in the color reproduction area) and thus improved in the quality regardless of a greater angle of incidence.

The eyepiece optical system includes preferably the reflective type hologram optical element for enlarging the image received from the reflective display device and directing the same as a virtual image to the eyes of the viewer. Since the reflective hologram optical element has a degree of the wavelength selectiveness, it can further increase the purity and the color reproduction of each color in combination with the reflective, ferroelectric LCD device.

The image display device according to the present invention is composed mainly of the illumination optical system, the reflective display device, and the eyepiece optical system. The illumination optical system includes the light source for emitting different wavelengths of the three primary colors of the light. The display device has a matrix of pixels for displaying the image produced by modifying the light emitted from the light source at each pixel. Each of the pixels on the display device is driven in a time-division mode in response to each of the three primary colors of the light emitted in a time-division sequence from the light source. The eyepiece optical system includes the hologram optical element for diffracting the wavelength of each color of the light received from the display device. When the wavelength range at half of the diffraction efficiency and the wavelength range at half of the intensity of each of the three primary colors of the light are $\Delta\lambda 1$ and $\Delta\lambda 2$ respectively in the hologram optical element, $\Delta\lambda 1 < \Delta\lambda 2$ is preferably established.

In the arrangement, since the relationship between the wavelength range $\Delta\lambda 1$ at half of the diffraction efficiency and the wavelength range $\Delta\lambda 2$ at half of the intensity of each of the three primary colors of the light is expressed by $\Delta\lambda 1 < \Delta\lambda 2$, a desired wavelength range of each of the R, G, and B colors of the light emitted from the light source can be diffracted by the action of the hologram optical element before received by the pupil of the viewer. As the result, the image to be viewed can be improved in the purity of each of the R, G, and B colors of the light regardless of the display device actuated in a time-division mode and increased greater in the color reproduction area than that produced directly from the light emitted from the light source.

In particular, when $\Delta\lambda 1 < 20$ nm is given at each of the three primary colors of the light, the color reproduction area can certainly be widened in the image to be viewed. Also, when each of the three primary colors of the light is defined by $\Delta\lambda 1 \leq 10$ nm, it can further be improved in the purity and widened in the color reproduction area in the image to be viewed.

According to the present invention, preferably, the hologram optical element is fabricated by exposing the hologram photo-sensitive material coated on a substrate to light. The hologram photo-sensitive material is preferably a single-layer color photo-polymer which is sensitive to all the three primary colors of the light.

Since the single-layer color photo-polymer is sensitive to all the three primary colors of the light, its single layer can record a hologram of the R, G, and B colors at different wavelengths of the light. Accordingly, the hologram optical element can be fabricated easily and stably. In addition, the single-layer color photo-polymer may be difficult for increasing the diffraction efficiency due to mutual action of the colors but can be minimized in the wavelength range at half of the diffraction efficiency.

According to the present invention, preferably, each of the three primary colors of the light is defined by preferably $\Delta\lambda 1 > 3$ nm. If $\Delta\lambda 1$ is smaller than 3 nm, the hologram optical element can be narrowed in the diffraction wavelength range although the color reproduction area remains widen, thus declining the efficiency of use of the light emitted from the light source and dimming the image to be viewed. When $\Delta\lambda 1 > 3$ nm is given for each of the three primary colors of the light, the image can be protected from being declined in the brightness while the color reproduction area remains widen.

According to the present invention, preferably, each of the three primary colors of the light is defined by $1/10 < \Delta\lambda 1 / \Delta\lambda 2 < 1$.

If $\Delta\lambda 1/\Delta\lambda 2$ is smaller than the lower limit, the hologram optical element can be narrowed in the diffraction wavelength range in relation to the wavelength range of the light emitted from the light source although the color reproduction area remains widen, thus maintaining the image to be viewed at higher brightness with much difficulty. On the other hand, if $\Delta\lambda 1/\Delta\lambda 2$ is greater than the upper limit, the image can be declined in the color reproduction range while remaining high in the brightness. Accordingly, with $\Delta\lambda 1/\Delta\lambda 2$ set to the above range, the image to be viewed can be improved in both the color reproduction area and the brightness.

According to the present invention, preferably, the peak wavelength at the diffraction efficiency of each of the three primary colors of the light in the hologram optical element stays within the wavelength range at half of the intensity of the light emitted from the light source.

This allows the peak wavelength at the diffraction efficiency of each of the three primary colors of the light in the hologram optical element to be substantially close to (or equal to) the peak wavelength of the intensity of the light emitted from the light source, the wavelength range at a higher level of the intensity of the light emitted from the light source can effectively be diffracted by the action of the hologram optical element and then received by the pupil of the viewer. Accordingly, the efficiency of use of the light emitted from the light source can be increased thus providing the viewer with the image at a higher brightness.

When the peak wavelength at the diffraction efficiency of each of the three primary colors of the light in the hologram optical element and the peak wavelength at the intensity of each of the three primary colors of the light emitted from the light source are $\lambda 1$ and $\lambda 2$ respectively, $\lambda 1$ is preferably equal to $\lambda 2 \pm 20$ nm.

This allows the peak wavelength at the diffraction efficiency in the hologram optical element to be close to the peak wavelength at the intensity of the light emitted from the light source at each of the three primary colors, the efficiency of use of the light emitted from the light source can be improved thus providing the viewer with the image at a higher brightness.

According to the present invention, the display device is preferably a ferroelectric LCD device. The ferroelectric LCD device is high in the response at high speeds and can produce the image at higher contrast. As the result, the display device of the ferroelectric LCD type can thus produce in a time-division mode the image at higher quality to be viewed by the viewer.

With the optical system of, for example, axially asymmetry type, the light emitted from the light source falls on the display device diagonally (at an angle of incidence). Accordingly, the display device is required to have a greater angle of view. Since the ferroelectric LCD device is great in the angle of view, its use with the axially asymmetry type optical system can highly be advantageous.

Also, the ferroelectric LCD device may be of a reflective type. Since the reflective type display device is capable of using a semiconductor substrate such as silicon substrate, it will be smaller in the size and higher in the degree of integration than any transparent type. Moreover, a periphery circuit including switching elements for driving the pixels and patterns of wiring is provided on the substrate at the side opposite to the display side. Accordingly, the aperture remains not lowered when the pixels are increased in the degree of integration. As the efficiency of reflection is increased, the image to be viewed can be improved in the brightness.

The image display apparatus according to the present invention includes the optical-path bending member (e.g., a reflective mirror or a prism) for bending the optical path which extends from the light source to the reflective, ferroelectric LCD device. The optical-path bending member is arranged so that the light directed from the light source to the optical-path bending member intersects the light directed from the reflective, ferroelectric LCD device to the eyepiece optical system. When the angle of incidence is θ at which the light emitted from the light source is reflected by the optical-path bending member and received by the reflective, ferroelectric LCD device, it is expressed by preferably 10°<θ<60°.

If the angle of incidence θ is smaller than the lower limit, the distance between the reflective, ferroelectric LCD device and the eyepiece optical system become wider. If the angle of incidence θ is greater than the upper limit, the distance between the light source and the optical-path bending member become wider. In either case, the downsizing of the apparatus can be interrupted. Accordingly, when the angle of incidence θ remains within the above range, the two optical paths can certainly be separated from each other without interrupting the downsizing of the apparatus.

According to the present invention, the hologram optical element is fabricated by exposing the hologram photo-sensitive material coated on a substrate to light. The hologram photo-sensitive material is preferably a three-layer color photo-polymer which includes three layers arranged sensitive to the three primary colors of the light respectively.

Since each layer of the three-layer color photo-polymer is sensitive to the corresponding one of the three primary colors of the light thus for recording a hologram of the corresponding color at a specific wavelength of the light, it can be prevented from permitting any mutual action between the colors thus being increased in the diffraction efficiency. Accordingly, the image to be viewed by the viewer can be improved in the brightness with no need of increasing the power of the light emitted from the light source. Because of no need of increasing the power of the light emitted from the light source, the apparatus can be minimized in the energy consumption.

According to the present invention, the hologram optical element has preferably a positive optical power at axially asymmetry. Using the hologram optical element of this type, the apparatus can be enhanced in the freedom of design for determining the position of the optical elements and thus decreased in the overall size.

According to the present invention, the hologram optical element is set with its diffraction efficiency of each of the three primary colors of the light preferably in relation to the intensity of the light emitted from the light source.

For example, when the G color of the light emitted from the light source which is higher in the visibility is lower in the intensity than the B and R colors, its diffraction efficiency in the hologram optical element can be set to a higher level. The B and R colors of the light in the hologram optical element may be set to such corresponding levels of the diffraction efficiency that the three, B, G, and R colors remain adequate in the color balance.

Accordingly, since the diffraction efficiency in the hologram optical element is determined at each of the three primary colors in relation to the intensity of the light emitted from the light source, the image to be viewed by the viewer can be improved in the brightness without increasing the amount of light from the light source (with low electric power consumption) while remaining high in the color balance.

According to the present invention, the displacement of the peak position of the light intensity in the optical pupil formed by the eyepiece optical system is preferably not greater than 1 mm between any two of the three primary colors.

In case that the peak position of the intensity (or the illumination intensity distribution) of the three primary colors of the light is dislocated in the optical pupil, depending on color, the peak position of the light intensity may deviate from the pupil of the viewer when the viewer's pupil is shifted. This will cause the viewer to sense an effect of color shading. Considering that the pupil of the viewer is generally not smaller than 2 mm in the diameter, the displacement of the peak position of the intensity in the optical pupil should not exceed 1 mm. Accordingly, even when its pupil is shifted, the viewer can sense a minimum of color shading.

According to the present invention, the hologram optical element may be a combiner for providing the pupil of the viewer with the image light received from the display device and the external scene of ambient light at the same time. This allows the viewer to simultaneously view the image displayed on the display device and the external scene through the hologram optical element.

The eyepiece optical system includes preferably the first transparent substrate for fully reflecting the image of the light received from the display device in its inner wall and directing the same across the hologram optical element to the pupil of the viewer while passing the external scene of light directly to the pupil of the viewer. With the first transparent substrate, the external scene can clearly be viewed due to a higher level of the transmission of the ambient light while the image of the light received from the display device is being monitored.

In addition, the eyepiece optical system includes preferably the second transparent substrate for canceling any refraction of the ambient light at the first transparent substrate. This prevents the external scene viewed by the viewer from being distorted through the eyepiece optical system.

It wound be understood from the above description that any changes and modifications are possible without departing from the scope of the present invention. The present invention will hence be embodied within the teaching of the appended claims with no limitation of terms and descriptions.

What is claimed is:

1. An image display apparatus comprising:
   an illumination optical system;
   a reflective type display device for displaying an image by modulating illumination light from the illumination optical system; and
   an eyepiece optical system for directing image light from the reflective type display device to a pupil of a viewer,
   the illumination optical system comprising:
   a light source for emitting light; and an optical-path bending member for bending an optical path leading from the light source to the reflective type display device, wherein the optical-path bending member is so arranged that a ray of light traveling from the light source to the optical-path bending member and a ray of light traveling further on a same optical path as said ray of light from the reflective type display device to the eyepiece optical system cross each other in a medium located outside the eyepiece optical system and having a substantially uniform index of refraction, and a reflection surface of the optical-path bending member and the optical path from the reflective type display device to the eyepiece optical system do not cross each other, the reflection surface being the last reflection surface before the reflective type display device on the same optical path.

2. An image display apparatus according to claim 1, wherein the medium arranged substantially uniform in the index of refraction is air.

3. An image display apparatus according to claim 1, wherein the medium arranged substantially uniform in the index of refraction is an illumination prism whose index of refraction n is defined by $1.4<n<2.0$.

4. An image display apparatus according to claim 3, wherein
the illumination prism has two sides thereof arranged across which the light directed from the reflective type display device to the eyepiece optical system runs in a sequence, and
the two sides are arranged planer and not parallel to each other.

5. An image display apparatus according to claim 3, wherein
the illumination prism has two sides thereof arranged across which the light directed from the reflective type display device to the eyepiece optical system runs in a sequence, and
at least one of the two sides is arranged arcuate as having an optical power.

6. An image display apparatus according to claim 1, wherein the optical-path bending member is located at the side opposite to the light source about the optical path which extends from the reflective type display device to the eyepiece optical system.

7. An image display apparatus according to claim 1, wherein the optical-path bending member is arranged to bend the optical path, which extends from the light source to the reflective type display device, on the plane arranged parallel to the short side of the reflective type display device and vertical to the screen of the reflective type display device.

8. An image display apparatus according to claim 1, wherein the optical-path bending member is a reflective mirror.

9. An image display apparatus according to claim 8, wherein the reflective mirror is of a concave mirror type for reflecting and converging the incoming light.

10. An image display apparatus according to claim 9, wherein the concave mirror is a cylindrical concave mirror for reflecting and converging the incoming light on the plane arranged parallel to the short side of the reflective type display device and vertical to the screen of the reflective type display device.

11. An image display apparatus according to claim 1, wherein
the illumination optical system includes a first polarizer for passing a desired polarized component of the light of which the optical path is bent by the optical-path bending member and directing the same to the reflective type display device, and
the eyepiece optical system includes:
an eyepiece prism for reflecting and advancing the incoming light in its interior; and
a second polarizer for passing, of light incident from the reflective type display device, another polarized component of the light which is orthogonal to the desired polarized component and directing the same to the eyepiece prism.

12. An image display apparatus according to claim 11, wherein the first polarizer is provided at the surface with an anti-reflection coating.

13. An image display apparatus according to claim 11, wherein the illumination optical system includes a third polarizer for passing, of the light emitted from the light source, a polarized component of the light which is identical to the desired polarized component passed through the first polarizer and directing the same to the optical-path bending member.

14. An image display apparatus according to claim 13, wherein the third polarizer is located at the light source side about the optical path which extends from the reflective type display device to the eyepiece optical system.

15. An image display apparatus according to claim 13, wherein both the first and third polarizers are arranged to pass a P polarized component of the light.

16. An image display apparatus according to claim 11, wherein the illumination optical system includes a diffuser plate for diffusing the light of which the optical path is bent by the optical-path bending member.

17. An image display apparatus according to claim 16, wherein the diffuser plate and the first polarizer are located in this order from the optical-path bending member side across the optical path between the optical-path bending member and the reflective type display device.

18. An image display apparatus according to claim 16, wherein the diffuser plate is a volume phase type hologram optical element.

19. An image display apparatus according to claim 3, wherein
the illumination optical system includes a first polarizer for passing a desired polarized component of the light of which the optical path is bent by the optical-path bending member and directing the same to the reflective type display device, and
the first polarizer is bonded to the illumination prism between the illumination prism and the optical-path bending member.

20. An image display apparatus according to claim 19, wherein
the illumination optical system includes a diffuser plate for diffusing the light of which the optical path is bent by the optical-path bending member, and
the diffuser plate is supported by the illumination prism across the first polarizer.

21. An image display apparatus according to claim 20, wherein the optical-path bending member is supported by the illumination prism across the diffuser plate and the first polarizer.

22. An image display apparatus according to claim 19, wherein the illumination prism has a side thereof arranged of a planer or cylindrical shape to which the first diffuser is bonded.

23. An image display apparatus according to claim 19, wherein
the eyepiece optical system includes:
an eyepiece prism for reflecting and advancing the incoming light in the its interior; and
a second polarizer for passing, of the light exiting from the reflective type display device, another polarized component of the light which is orthogonal to the desired polarized component and directing the same to the eyepiece prism, the second polarizer located between the illumination prism and the eyepiece prism.

24. An image display apparatus according to claim 23, wherein the second polarizer is bonded the illumination prism.

25. An image display apparatus according to claim 24, wherein the eyepiece prism is supported by the illumination prism across the second polarizer.

26. An image display apparatus according to claim 24, wherein the illumination prism has a side thereof arranged of a planer or cylindrical shape to which the second polarizer is bonded.

27. An image display apparatus according to claim 1, wherein
providing a reference axis extending between the center of the screen of the reflective type display device and the center of the pupil across the optical path which extends from the reflective type display device across the eyepiece optical system to the pupil,
the reflective type display device is arranged with its display screen tilting towards the reference axis between the reflective type display device and the eyepiece optical system.

28. An image display apparatus according to claim 27, wherein when the angle of incidence is θ at which the light of which the optical path is bent by the optical-path bending member enters the reflective type display device, it is defined by 10°<θ<60°.

29. An image display apparatus according to claim 1, wherein
the light source includes at least one set of point light sources which emit different wavelengths of the light respectively, and
the point light sources are aligned along the direction parallel to the long side of the reflective type display device.

30. An image display apparatus according to claim 29, wherein
the light source includes an even number of sets of the point light sources, and
any two adjacent sets of the point light sources are opposite to each other in the order of the point light sources along the direction parallel to the long side of the reflective type display device.

31. An image display apparatus according to claim 1, wherein the reflective type display device is a reflective type ferroelectric liquid crystal display device.

32. An image display apparatus according to claim 31, wherein the eyepiece optical system includes a reflective type hologram optical element for enlarging the image receive from the reflective type display device and directing the same as a virtual image to the eyes of the viewer.

33. A head-mount display comprising:
an image display apparatus; and
a supporting member for supporting the image display apparatus at the front of a viewer,
the image display apparatus comprising:
an illumination optical system;
a reflective type display device for displaying an image by modulating illumination light from the illumination optical system; and
an eyepiece optical system for directing image light from the reflective type display device to a pupil of a viewer,
the illumination optical system comprising:
a light source for emitting light; and
an optical-path bending member for bending an optical path leading from the light source to the reflective type display device,
wherein the optical-path bending member is so arranged that a ray of light traveling from the light source to the optical-path bending member and a ray of light traveling further on a same optical path as said ray of light from the reflective type display device to the eyepiece optical system cross each other in a medium located outside the eyepiece optical system and having a substantially uniform index of refraction, and a reflection surface of the optical-path bending member and the optical path from the reflective type display device to the eyepiece optical system do not cross each other, the reflection surface being the last reflection surface before the reflective type display device on the same optical path.

* * * * *